United States Patent
Jones

(10) Patent No.: US 7,647,275 B2
(45) Date of Patent: Jan. 12, 2010

(54) AUTOMATED PAYMENT SYSTEM AND METHOD

(75) Inventor: John E. Jones, Winnetka, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 1756 days.

(21) Appl. No.: 09/899,727

(22) Filed: Jul. 5, 2001

(65) Prior Publication Data

US 2003/0009420 A1    Jan. 9, 2003

(51) Int. Cl.
*G06Q 40/00* (2006.01)
(52) U.S. Cl. .............................. 705/40; 705/35; 705/16; 705/23
(58) Field of Classification Search ................... 705/38, 705/40, 35, 16, 23
See application file for complete search history.

(56) References Cited

U.S. PATENT DOCUMENTS

| | | | |
|---|---|---|---|
| 446,303 A | 2/1891 | Thompson | |
| 2,669,998 A | 2/1954 | Buchholz | 133/8 |
| 2,750,949 A | 6/1956 | Kulo et al. | 133/8 |
| 2,835,260 A | 5/1958 | Buchholz | 133/8 |
| 2,936,684 A | 5/1960 | Simjian | 95/1.1 |
| 3,104,314 A | 9/1963 | Simjian | 235/61.9 |
| 3,148,932 A | 9/1964 | Simjian | 346/22 |
| 3,150,912 A | 9/1964 | Simjian | 346/22 |
| 3,246,295 A | 4/1966 | DeClaris et al. | 382/56 |
| 3,280,974 A | 10/1966 | Riddle et al. | 209/111.8 |
| 3,443,107 A | 5/1969 | Modglin | 250/219 |
| 3,480,785 A | 11/1969 | Aufderheide | 250/219 |
| 3,496,370 A | 2/1970 | Haville et al. | 250/219 |
| 3,509,535 A | 4/1970 | Berube | 340/149 |
| 3,612,835 A | 10/1971 | Andrews et al. | 235/61.11 D |
| 3,618,765 A | 11/1971 | Syoasel et al. | 209/122 |
| 3,656,615 A | 4/1972 | Ptacek | 209/73 |
| 3,679,314 A | 7/1972 | Mustert | 356/71 |

(Continued)

FOREIGN PATENT DOCUMENTS

DE    28 24 849 A1    12/1979

(Continued)

OTHER PUBLICATIONS

ATM Cardpay Introduces New Bill Payment Idea Retail Delivery Systems News. Potomac: Jan. 16, 1998. vol. 3, Iss. 1; p. 1.*

(Continued)

*Primary Examiner*—Lalita M Hamilton
(74) *Attorney, Agent, or Firm*—Nixon Peabody LLP

(57) ABSTRACT

An automated payment system for processing payment by a customer to a company. The payment system includes a document scanning system which has an input receptacle adapted to accept a document. After receiving an authorization agreement from the customer, the scanner acquires at least one image from the document. Also provided is a first computer adapted to receive images from the document scanning system. Adapted to communicate information represented by the image, a first communication link couples the document scanning system and the first computer. The payment system also includes a second computer adapted to receive images which is in communication with the first computer via a second communication link. The second communication link is adapted to communicate images and payment information.

81 Claims, 19 Drawing Sheets

U.S. PATENT DOCUMENTS

| | | | |
|---|---|---|---|
| 3,715,031 A | 2/1973 | Okkonen | 209/75 |
| 3,725,667 A | 4/1973 | Schwartz | 250/219 DQ |
| 3,764,899 A | 10/1973 | Peterson | 324/61 R |
| 3,778,628 A | 12/1973 | Novak et al. | 250/556 |
| 3,782,543 A | 1/1974 | Martelli et al. | 209/75 |
| 3,798,603 A | 3/1974 | Wahlberg | 340/149 |
| 3,800,078 A | 3/1974 | Cochran et al. | 178/7.1 |
| 3,806,710 A | 4/1974 | Shigemori et al. | 235/92 |
| 3,815,021 A | 6/1974 | Kerr | 324/61 R |
| 3,842,281 A | 10/1974 | Goodrich | 250/461 |
| 3,870,629 A | 3/1975 | Carter et al. | 209/111.8 |
| 3,906,449 A | 9/1975 | Marchak | 340/149 R |
| 3,930,582 A | 1/1976 | Gartner et al. | 209/88 |
| 3,966,047 A | 6/1976 | Steiner | 209/75 |
| 3,976,198 A | 8/1976 | Carnes, Jr. et al. | 209/111.7 T |
| 4,023,011 A | 5/1977 | Nakajima et al. | 235/61.11 R |
| 4,027,142 A | 5/1977 | Paup et al. | 235/379 |
| 4,040,010 A | 8/1977 | Crane et al. | 340/146.3 SY |
| 4,041,456 A | 8/1977 | Ott et al. | 382/135 |
| 4,096,991 A | 6/1978 | Iguchi | 235/419 |
| 4,109,238 A | 8/1978 | Creekmore | 340/149 |
| 4,114,027 A | 9/1978 | Slater et al. | 705/43 |
| 4,114,804 A | 9/1978 | Jones et al. | 235/476 |
| 4,147,430 A | 4/1979 | Gorgone et al. | 356/51 |
| 4,166,945 A | 9/1979 | Inoyama et al. | 235/379 |
| 4,179,685 A | 12/1979 | O'Maley | 340/146.3 H |
| 4,180,798 A | 12/1979 | Komori et al. | 340/146.3 H |
| 4,187,463 A | 2/1980 | Kivenson | 324/228 |
| 4,197,986 A | 4/1980 | Nagata | 235/379 |
| 4,201,978 A | 5/1980 | Nally | 382/140 |
| 4,205,780 A | 6/1980 | Burns et al. | 235/454 |
| 4,231,014 A | 10/1980 | Ponzio | 340/146.3 Y |
| 4,237,378 A | 12/1980 | Jones | 250/223 R |
| 4,250,806 A | 2/1981 | Boyson et al. | 101/2 |
| 4,255,651 A | 3/1981 | Phillips | 235/92 |
| 4,264,808 A | 4/1981 | Owens et al. | 235/379 |
| 4,275,874 A | 6/1981 | DiBlasio | 271/4 |
| 4,277,774 A | 7/1981 | Fujii et al. | 340/146.3 |
| 4,283,708 A | 8/1981 | Lee | 340/146.3 Z |
| 4,288,781 A | 9/1981 | Sellner et al. | 340/146.3 |
| 4,302,781 A | 11/1981 | Ikeda et al. | 358/486 |
| 4,310,885 A | 1/1982 | Azcua et al. | 364/405 |
| 4,311,914 A | 1/1982 | Huber | 250/556 |
| 4,313,598 A | 2/1982 | DiBlasio | 271/124 |
| 4,321,672 A | 3/1982 | Braun et al. | 364/408 |
| 4,326,636 A | 4/1982 | Kawakami | 209/534 |
| 4,334,619 A | 6/1982 | Horino et al. | 209/551 |
| 4,337,864 A | 7/1982 | McLean | 209/534 |
| 4,348,656 A | 9/1982 | Gorgone et al. | 340/146.3 R |
| 4,349,111 A | 9/1982 | Shah et al. | 209/534 |
| 4,352,988 A | 10/1982 | Ishida | 250/559 |
| 4,355,300 A | 10/1982 | Weber | 340/146.3 C |
| 4,355,369 A | 10/1982 | Garvin | 364/900 |
| 4,356,473 A | 10/1982 | Freudenthal | 340/146.3 H |
| 4,360,034 A | 11/1982 | Davila et al. | 133/3 |
| 4,381,447 A | 4/1983 | Horvath et al. | 250/223 |
| 4,383,540 A | 5/1983 | DeMeyer et al. | 133/3 H |
| 4,386,432 A | 5/1983 | Nakamura et al. | 382/7 |
| 4,396,902 A | 8/1983 | Warthan et al. | 382/64 |
| 4,416,299 A | 11/1983 | Bergman | 133/1 R |
| 4,420,153 A | 12/1983 | Winkler et al. | 271/304 |
| 4,435,834 A | 3/1984 | Pauli et al. | 382/135 |
| 4,441,205 A | 4/1984 | Berkin et al. | 382/8 |
| 4,442,541 A | 4/1984 | Finkel et al. | 382/7 |
| 4,449,240 A | 5/1984 | Yoshida | 382/15 |
| 4,461,028 A | 7/1984 | Okubo | 382/15 |
| 4,464,786 A | 8/1984 | Nishito et al. | 382/7 |
| 4,464,787 A | 8/1984 | Fish et al. | 382/7 |
| RE31,692 E | 10/1984 | Tyburski et al. | 382/7 |
| 4,480,177 A | 10/1984 | Allen | 235/379 |
| 4,487,306 A | 12/1984 | Nao et al. | 194/4 |
| 4,490,846 A | 12/1984 | Ishida et al. | 382/7 |
| 4,513,439 A | 4/1985 | Gorgone et al. | 382/7 |
| 4,521,008 A | 6/1985 | Granzow et al. | 271/3 |
| 4,523,330 A | 6/1985 | Cain | 382/140 |
| 4,530,067 A | 7/1985 | Dorr | 364/900 |
| 4,538,719 A | 9/1985 | Gray et al. | 194/100 A |
| 4,539,702 A | 9/1985 | Oka | 382/7 |
| 4,542,829 A | 9/1985 | Emery et al. | 209/534 |
| 4,543,969 A | 10/1985 | Rasmussen | 133/3 |
| 4,544,266 A | 10/1985 | Antes | 356/71 |
| 4,547,896 A | 10/1985 | Ohtombe et al. | 382/7 |
| 4,553,222 A | 11/1985 | Kurland et al. | 364/900 |
| 4,553,846 A | 11/1985 | Hilton et al. | 356/429 |
| 4,556,140 A | 12/1985 | Okada | 194/4 |
| 4,558,224 A | 12/1985 | Gober | 250/460.1 |
| 4,559,451 A | 12/1985 | Curl | 250/560 |
| 4,563,771 A | 1/1986 | Gorgone et al. | 382/7 |
| 4,567,370 A | 1/1986 | Falls | 250/461.1 |
| 4,569,421 A | 2/1986 | Sandstedt | 186/39 |
| 4,582,172 A | 4/1986 | Takeuchi et al. | 186/38 |
| 4,584,529 A | 4/1986 | Aoyama | 324/261 |
| 4,587,412 A | 5/1986 | Apisdorf | 235/449 |
| 4,587,434 A | 5/1986 | Roes et al. | 250/556 |
| 4,590,606 A | 5/1986 | Rohrer | 382/7 |
| 4,592,090 A | 5/1986 | Curl et al. | 382/7 |
| 4,593,184 A | 6/1986 | Bryce | 235/449 |
| 4,594,664 A | 6/1986 | Hashimoto | 364/405 |
| 4,602,332 A | 7/1986 | Hirose et al. | 364/408 |
| 4,605,926 A | 8/1986 | Onishi et al. | 340/825.3 |
| 4,611,345 A | 9/1986 | Ohnishi et al. | 382/7 |
| 4,617,457 A | 10/1986 | Granzow et al. | 235/379 |
| 4,617,458 A | 10/1986 | Bryce | 235/449 |
| 4,628,194 A | 12/1986 | Dobbins et al. | 235/379 |
| 4,645,936 A | 2/1987 | Gorgone | 250/556 |
| 4,653,647 A | 3/1987 | Hashimoto | 209/534 |
| 4,658,289 A | 4/1987 | Nagano et al. | 358/75 |
| 4,676,343 A | 6/1987 | Humble et al. | 186/61 |
| 4,677,682 A | 6/1987 | Miyagawa et al. | 382/7 |
| 4,678,072 A | 7/1987 | Kobayashi et al. | 194/206 |
| 4,680,803 A | 7/1987 | Dilella | 382/9 |
| 4,685,141 A | 8/1987 | Hoque et al. | 382/7 |
| 4,686,357 A | 8/1987 | Douno et al. | 235/379 |
| 4,694,963 A | 9/1987 | Takesako | 209/534 |
| 4,697,071 A | 9/1987 | Hiraoka et al. | 235/379 |
| 4,700,368 A | 10/1987 | Munn et al. | 377/8 |
| 4,716,456 A | 12/1987 | Hosaka | 358/75 |
| 4,733,308 A | 3/1988 | Nakamura et al. | 358/496 |
| 4,735,289 A | 4/1988 | Kenyon | 186/37 |
| 4,743,743 A | 5/1988 | Fukatsu | 235/379 |
| 4,743,974 A | 5/1988 | Lockwood | 358/285 |
| 4,748,679 A | 5/1988 | Gold et al. | 382/61 |
| 4,749,087 A | 6/1988 | Buttifant | 209/534 |
| 4,753,625 A | 6/1988 | Okada | 453/32 |
| 4,764,725 A | 8/1988 | Bryce | 324/234 |
| 4,764,976 A | 8/1988 | Kallin et al. | 382/65 |
| 4,782,328 A | 11/1988 | Denlinger | 340/365 |
| 4,784,274 A | 11/1988 | Mori et al. | 209/534 |
| 4,803,347 A | 2/1989 | Sugahara et al. | 235/379 |
| 4,806,709 A | 2/1989 | Evans | 178/19 |
| 4,811,004 A | 3/1989 | Person et al. | 340/712 |
| 4,817,176 A | 3/1989 | Marshall et al. | 382/43 |
| 4,821,332 A | 4/1989 | Durham | 382/7 |
| 4,823,393 A | 4/1989 | Kawakami | 382/7 |
| 4,825,246 A | 4/1989 | Fukuchi et al. | 355/4 |
| 4,827,531 A | 5/1989 | Milford | 382/7 |
| 4,837,842 A | 6/1989 | Holt | 382/26 |
| 4,841,358 A | 6/1989 | Kammoto et al. | 358/75 |
| 4,851,616 A | 7/1989 | Wales et al. | 178/18 |
| 4,877,230 A | 10/1989 | Winkler et al. | 271/3 |
| 4,880,096 A | 11/1989 | Kobayashi et al. | 194/206 |
| 4,881,268 A | 11/1989 | Uchida et al. | 382/7 |
| 4,883,181 A | 11/1989 | Yoshikawa | 209/534 |
| 4,888,812 A | 12/1989 | Dinan et al. | 382/7 |

| | | | | | | | |
|---|---|---|---|---|---|---|---|
| 4,903,953 A | 2/1990 | Winkler et al. | 271/4 | 5,317,140 A | 5/1994 | Dunthorn | 250/221 |
| 4,905,839 A | 3/1990 | Yuge et al. | 209/534 | 5,321,238 A | 6/1994 | Kamata et al. | 235/379 |
| 4,905,840 A | 3/1990 | Yuge et al. | 209/534 | 5,335,292 A | 8/1994 | Lovelady et al. | 382/17 |
| 4,908,516 A | 3/1990 | West | 250/556 | 5,341,408 A | 8/1994 | Melcher et al. | 377/8 |
| 4,922,109 A | 5/1990 | Bercovitz et al. | 194/207 | 5,342,165 A | 8/1994 | Graef et al. | 414/788.9 |
| 4,928,094 A | 5/1990 | Smith | 340/712 | 5,363,949 A | 11/1994 | Matsubayashi | |
| 4,931,782 A | 6/1990 | Jackson | 340/706 | 5,367,577 A | 11/1994 | Gotaas | 382/7 |
| 4,947,441 A | 8/1990 | Hara et al. | 382/7 | 5,368,147 A | 11/1994 | Menke et al. | 194/206 |
| 4,948,174 A | 8/1990 | Thomson et al. | 283/58 | 5,371,345 A | 12/1994 | LeStrange et al. | 235/380 |
| 4,954,697 A | 9/1990 | Kokubun et al. | 235/381 | 5,371,798 A | 12/1994 | McWhortor | 380/51 |
| 4,958,235 A | 9/1990 | Sims et al. | 358/402 | 5,373,550 A | 12/1994 | Campbell et al. | 379/100 |
| 4,960,981 A | 10/1990 | Benton et al. | 705/41 | 5,379,344 A | 1/1995 | Larson et al. | 380/23 |
| 4,970,655 A | 11/1990 | Winn et al. | 364/479 | 5,381,019 A | 1/1995 | Sato | 250/556 |
| 4,973,851 A | 11/1990 | Lee | 250/556 | 5,383,754 A | 1/1995 | Sumida et al. | 412/11 |
| 4,980,543 A | 12/1990 | Hara et al. | 209/534 | 5,394,969 A | 3/1995 | Harbaugh | 194/206 |
| 4,984,280 A | 1/1991 | Abe | 382/7 | 5,399,874 A | 3/1995 | Gonsalves et al. | 250/556 |
| 4,992,860 A | 2/1991 | Hamaguchi et al. | 358/75 | 5,402,895 A | 4/1995 | Mikkelsen et al. | 209/534 |
| 4,996,604 A | 2/1991 | Oqawa et al. | 358/486 | 5,416,307 A | 5/1995 | Danek et al. | 235/449 |
| 5,023,782 A | 6/1991 | Lutz et al. | 364/405 | 5,417,316 A | 5/1995 | Harbaugh | 194/206 |
| 5,027,415 A | 6/1991 | Hara et al. | 382/7 | 5,418,458 A | 5/1995 | Jeffers | 324/235 |
| 5,040,226 A | 8/1991 | Elischer et al. | 382/7 | 5,419,424 A | 5/1995 | Harbaugh | 194/206 |
| 5,047,871 A | 9/1991 | Meyer et al. | 358/486 | 5,421,443 A | 6/1995 | Hatamachie et al. | 914/206 |
| 5,054,621 A | 10/1991 | Murphy et al. | 209/534 | 5,430,664 A | 7/1995 | Cargill et al. | 364/550 |
| 5,055,834 A | 10/1991 | Chiba | 340/825 | 5,434,427 A | 7/1995 | Crane et al. | 250/556 |
| 5,063,599 A | 11/1991 | Concannon et al. | 382/7 | 5,437,357 A | 8/1995 | Ota et al. | 194/206 |
| 5,068,519 A | 11/1991 | Bryce | 235/449 | 5,438,184 A | 8/1995 | Roberts et al. | 235/380 |
| 5,076,441 A | 12/1991 | Gerlier | 209/534 | 5,444,793 A | 8/1995 | Kelland | 382/138 |
| 5,091,961 A | 2/1992 | Baus, Jr. | 382/7 | 5,444,794 A | 8/1995 | Uhland, Sr. | 382/137 |
| 5,097,517 A | 3/1992 | Holt | 382/7 | 5,459,304 A | 10/1995 | Eisenmann | 235/380 |
| 5,105,364 A | 4/1992 | Kawamura et al. | 364/478 | 5,465,301 A | 11/1995 | Jotcham et al. | 380/54 |
| 5,105,601 A | 4/1992 | Horiguchi et al. | 53/465 | 5,465,821 A | 11/1995 | Akioka | 194/207 |
| 5,114,381 A | 5/1992 | Ueda et al. | 453/57 | 5,467,405 A | 11/1995 | Raterman et al. | 382/135 |
| 5,119,433 A | 6/1992 | Will | 882/138 | 5,467,406 A | 11/1995 | Graves et al. | 382/135 |
| 5,120,944 A | 6/1992 | Kern et al. | 235/379 | 5,468,971 A | 11/1995 | Ebstein et al. | 250/556 |
| 5,122,754 A | 6/1992 | Gotaas | 324/676 | 5,469,241 A | 11/1995 | Takahashi et al. | 355/64 |
| 5,134,663 A | 7/1992 | Kozlowski | 382/7 | 5,476,169 A | 12/1995 | Takarada et al. | 194/207 |
| 5,135,115 A | 8/1992 | Miller et al. | 209/564 | 5,481,377 A | 1/1996 | Udagawa et al. | 358/501 |
| 5,144,115 A | 9/1992 | Yoshida | 235/379 | 5,488,671 A | 1/1996 | Kern | 382/138 |
| 5,146,512 A | 9/1992 | Weideman et al. | 382/30 | 5,491,325 A | 2/1996 | Huang et al. | 705/45 |
| 5,151,607 A | 9/1992 | Crane | 250/556 | 5,504,822 A | 4/1996 | Holt | 382/218 |
| 5,154,272 A | 10/1992 | Nishiumi et al. | 194/318 | 5,506,691 A | 4/1996 | Bednar et al. | 358/402 |
| 5,159,548 A | 10/1992 | Caslavka | 364/408 | 5,509,692 A | 4/1996 | Oz | 283/70 |
| 5,163,672 A | 11/1992 | Mennie | 271/187 | D369,984 S | 5/1996 | Larsen | D10/97 |
| 5,163,868 A | 11/1992 | Adams et al. | 453/11 | 5,523,575 A | 6/1996 | Machida et al. | 250/208.1 |
| 5,167,313 A | 12/1992 | Dobbins et al. | 194/317 | 5,530,772 A | 6/1996 | Storey | 382/135 |
| 5,183,142 A | 2/1993 | Katchinian et al. | 194/206 | 5,537,486 A | 7/1996 | Stratigos et al. | 382/137 |
| 5,184,115 A | 2/1993 | Black et al. | 340/708 | 5,544,043 A | 8/1996 | Miki et al. | 364/406 |
| 5,184,709 A | 2/1993 | Nishiumi et al. | 194/318 | 5,545,885 A | 8/1996 | Jagielinski | 235/449 |
| 5,186,334 A | 2/1993 | Fukudome et al. | 209/534 | 5,564,546 A | 10/1996 | Molbak et al. | 194/216 |
| 5,187,750 A | 2/1993 | Behera | 382/7 | 5,586,036 A | 12/1996 | Pintsov | 364/464 |
| 5,191,525 A | 3/1993 | LeBrun et al. | 715/500 | 5,590,196 A | 12/1996 | Moreau | 380/18 |
| 5,193,121 A | 3/1993 | Elischer et al. | 382/7 | 5,592,377 A | 1/1997 | Lipkin | 395/242 |
| 5,198,976 A | 3/1993 | Form et al. | 364/410 | 5,592,561 A | 1/1997 | Moore | 382/103 |
| 5,199,543 A | 4/1993 | Kamagami et al. | 194/207 | 5,594,225 A | 1/1997 | Botvin | 235/379 |
| 5,201,395 A | 4/1993 | Takizawa et al. | 194/206 | 5,600,732 A | 2/1997 | Ott et al. | 382/112 |
| 5,207,788 A | 5/1993 | Geib et al. | 271/122 | 5,602,933 A | 2/1997 | Blackwell et al. | 382/116 |
| 5,231,381 A | 7/1993 | Duwaer | 340/712 | 5,602,936 A | 2/1997 | Green et al. | 382/140 |
| 5,237,158 A | 8/1993 | Kern et al. | 235/379 | 5,607,040 A | 3/1997 | Mathurin, Sr. | 194/207 |
| 5,237,159 A | 8/1993 | Stephens et al. | 235/379 | 5,615,280 A | 3/1997 | Izawa et al. | 382/135 |
| 5,239,593 A | 8/1993 | Wittner et al. | 382/14 | 5,620,079 A | 4/1997 | Molbak | 194/217 |
| 5,251,738 A | 10/1993 | Dabrowski | 194/206 | 5,633,949 A | 5/1997 | Graves et al. | 382/135 |
| 5,252,811 A | 10/1993 | Henochowicz et al. | 235/379 | 5,640,463 A | 6/1997 | Csulits | 382/135 |
| 5,261,518 A | 11/1993 | Bryce | 194/206 | 5,652,802 A | 7/1997 | Graves et al. | 382/135 |
| 5,265,008 A | 11/1993 | Benton et al. | 364/408 | 5,657,846 A | 8/1997 | Schwartz | 194/206 |
| 5,272,641 A | 12/1993 | Shabatake | 370/392 | 5,678,046 A | 10/1997 | Cahill et al. | 395/616 |
| 5,279,403 A | 1/1994 | Harbaugh et al. | 194/207 | 5,680,472 A | 10/1997 | Conant | 382/135 |
| 5,286,954 A | 2/1994 | Sato et al. | 235/379 | 5,687,963 A | 11/1997 | Mennie | 271/119 |
| 5,295,196 A | 3/1994 | Raterman et al. | 382/135 | 5,692,067 A | 11/1997 | Raterman et al. | 382/135 |
| 5,297,030 A | 3/1994 | Vassigh et al. | 364/405 | 5,704,491 A | 1/1998 | Graves | 209/534 |
| 5,299,977 A | 4/1994 | Mazur et al. | 453/10 | 5,719,948 A | 2/1998 | Liang | 382/112 |
| 5,304,813 A | 4/1994 | DeMan | 250/556 | 5,724,438 A | 3/1998 | Graves | 382/135 |
| 5,308,992 A | 5/1994 | Crane et al. | 250/556 | 5,727,667 A | 3/1998 | Nye | 194/207 |
| 5,309,515 A | 5/1994 | Troung et al. | 382/7 | 5,729,623 A | 3/1998 | Omatu et al. | 382/155 |

| | | | | | | | |
|---|---|---|---|---|---|---|---|
| 5,751,840 | A | 5/1998 | Raterman et al. ........... 382/135 | 6,378,683 | B2 | 4/2002 | Mennie ....................... 194/207 |
| 5,751,842 | A | 5/1998 | Riach et al. ................. 382/137 | 6,381,354 | B1 | 4/2002 | Mennie et al. ............. 382/135 |
| 5,754,673 | A | 5/1998 | Brooks et al. ............... 382/112 | 6,398,000 | B1 | 6/2002 | Jenrick et al. .............. 194/200 |
| 5,761,089 | A | 6/1998 | McInerny ................... 364/550 | 6,415,983 | B1 | 7/2002 | Ulvr et al. ................... 235/487 |
| 5,781,654 | A | 7/1998 | Carney ....................... 382/137 | 6,459,806 | B1 | 10/2002 | Raterman et al. ........... 382/135 |
| 5,790,693 | A | 8/1998 | Graves et al. ............... 382/135 | 6,460,705 | B1 | 10/2002 | Hallowell ................... 209/534 |
| 5,790,697 | A | 8/1998 | Munro et al. ............... 382/135 | 6,473,519 | B1 | 10/2002 | Pidhirny et al. ............. 382/140 |
| 5,799,767 | A | 9/1998 | Molbak ....................... 194/217 | 6,493,461 | B1 | 12/2002 | Mennie et al. ............. 382/135 |
| 5,806,650 | A | 9/1998 | Mennie et al. ............. 194/206 | 6,539,104 | B1 | 3/2003 | Raterman et al. ........... 382/135 |
| 5,813,510 | A | 9/1998 | Rademacher ............... 194/206 | 6,546,351 | B1 | 4/2003 | Haycock et al. ............ 702/127 |
| 5,815,592 | A | 9/1998 | Mennie et al. ............. 382/135 | 6,550,671 | B1 | 4/2003 | Brown et al. ............... 235/379 |
| 5,822,448 | A | 10/1998 | Graves et al. ............... 382/135 | 6,560,355 | B2 | 5/2003 | Graves et al. ............... 382/135 |
| 5,830,054 | A | 11/1998 | Petri ............................ 453/5 | 6,573,983 | B1 | 6/2003 | Laskowski ................... 356/71 |
| 5,832,104 | A | 11/1998 | Graves et al. ............... 382/135 | 6,588,569 | B1 | 7/2003 | Jenrick et al. .............. 194/206 |
| 5,832,463 | A | 11/1998 | Funk | 6,601,687 | B1 | 8/2003 | Jenrick et al. .............. 194/206 |
| 5,852,811 | A | 12/1998 | Atkins ......................... 705/36 | 6,603,872 | B2 | 8/2003 | Jones et al. ................. 382/135 |
| 5,867,589 | A | 2/1999 | Graves et al. ............... 382/135 | 6,621,919 | B2 | 9/2003 | Mennie et al. ............. 382/135 |
| 5,870,487 | A | 2/1999 | Graves et al. ............... 382/135 | 6,628,816 | B2 | 9/2003 | Mennie et al. ............. 382/135 |
| 5,870,725 | A | 2/1999 | Bellinger et al. ............. 705/45 | 6,636,624 | B2 | 10/2003 | Raterman et al. ........... 382/135 |
| 5,875,259 | A | 2/1999 | Mennie et al. ............. 382/135 | 6,647,136 | B2 | 11/2003 | Jones et al. ................. 382/137 |
| 5,905,810 | A | 5/1999 | Jones et al. ................. 382/135 | 6,650,767 | B2 | 11/2003 | Jones et al. ................. 382/135 |
| 5,909,502 | A | 6/1999 | Mazur ......................... 382/135 | 6,654,486 | B2 | 11/2003 | Jones et al. ................. 382/135 |
| 5,909,503 | A | 6/1999 | Graves et al. ............... 382/135 | 6,661,910 | B2 | 12/2003 | Jones et al. ................. 382/135 |
| 5,912,982 | A | 6/1999 | Munro et al. ............... 382/135 | 6,665,431 | B2 | 12/2003 | Jones et al. ................. 382/135 |
| 5,917,930 | A | 6/1999 | Kayani et al. ............... 382/135 | 6,678,401 | B2 | 1/2004 | Jones et al. ................. 382/135 |
| 5,918,748 | A | 7/1999 | Clark et al. ................. 209/534 | 6,678,402 | B2 | 1/2004 | Jones et al. ................. 382/135 |
| 5,923,413 | A | 7/1999 | Laskowski ................... 356/71 | 6,697,511 | B1 | 2/2004 | Haycock ..................... 382/135 |
| 5,926,392 | A | 7/1999 | York et al. .................. 700/223 | 6,705,470 | B2 | 3/2004 | Klein et al. ................. 209/534 |
| 5,926,550 | A | 7/1999 | Davis ........................... 380/25 | 6,721,442 | B1 | 4/2004 | Mennie et al. ............. 382/135 |
| 5,930,778 | A * | 7/1999 | Geer ............................ 705/45 | 6,724,926 | B2 | 4/2004 | Jones et al. ................. 382/135 |
| 5,938,044 | A | 8/1999 | Weggesser ................... 209/534 | 6,724,927 | B2 | 4/2004 | Jones et al. ................. 382/135 |
| 5,940,623 | A | 8/1999 | Watts et al. .................. 395/712 | 6,731,785 | B1 | 5/2004 | Mennie et al. ............. 382/135 |
| 5,940,844 | A | 8/1999 | Cahill et al. ................. 707/526 | 6,731,786 | B2 | 5/2004 | Jones et al. ................. 382/135 |
| 5,943,655 | A | 8/1999 | Jacobson ..................... 705/30 | 6,748,101 | B1 | 6/2004 | Jones et al. ................. 382/135 |
| 5,947,255 | A | 9/1999 | Shimada et al. ............. 194/207 | 6,778,693 | B2 | 8/2004 | Jones et al. ................. 382/136 |
| 5,960,103 | A | 9/1999 | Graves et al. ............... 382/135 | 6,798,899 | B2 | 9/2004 | Mennie et al. ........... 271/10.09 |
| 5,966,456 | A | 10/1999 | Jones et al. ................. 382/135 | 7,006,664 | B2 | 2/2006 | Paraskevakos .............. 382/100 |
| 5,982,918 | A | 11/1999 | Mennie et al. ............. 382/135 | 7,034,324 | B2 | 4/2006 | Voser ........................ 250/556 |
| 5,992,601 | A | 11/1999 | Mennie et al. ............. 194/207 | 7,092,560 | B2 | 8/2006 | Jones et al. ................. 382/135 |
| 6,012,565 | A | 1/2000 | Mazur ......................... 194/207 | 7,216,106 | B1 | 5/2007 | Buchanan et al. ............ 705/45 |
| 6,021,883 | A | 2/2000 | Casanova et al. ........... 194/217 | 7,248,730 | B2 | 7/2007 | Matsui et al. ................ 382/135 |
| 6,023,684 | A | 2/2000 | Pearson ....................... 705/35 | 2001/0015311 | A1 | 8/2001 | Mennie ....................... 194/302 |
| 6,026,175 | A | 2/2000 | Munro et al. ............... 382/135 | 2001/0018739 | A1 | 8/2001 | Anderson et al. ........... 713/176 |
| 6,028,951 | A | 2/2000 | Raterman et al. ........... 382/135 | 2001/0035603 | A1 | 11/2001 | Graves et al. ........... 271/265.01 |
| 6,038,553 | A | 3/2000 | Hyde, Jr. ...................... 705/45 | 2001/0053241 | A1 | 12/2001 | Haycock ..................... 382/135 |
| 6,039,645 | A | 3/2000 | Mazur ......................... 453/10 | 2002/0020603 | A1 | 2/2002 | Jones et al. ................. 194/346 |
| 6,065,672 | A | 5/2000 | Haycock ..................... 235/379 | 2002/0056605 | A1 | 5/2002 | Mazur et al. ................ 194/207 |
| 6,068,194 | A | 5/2000 | Mazur ......................... 235/492 | 2002/0082993 | A1 | 6/2002 | Hoyos et al. ................. 705/43 |
| 6,072,896 | A | 6/2000 | Graves et al. ............... 382/135 | 2002/0085745 | A1 | 7/2002 | Jones et al. ................. 382/135 |
| 6,073,744 | A | 6/2000 | Raterman et al. ........... 194/207 | 2002/0118871 | A1 | 8/2002 | Jones et al. ................. 382/137 |
| 6,074,334 | A | 6/2000 | Mennie et al. ............. 493/438 | 2002/0126885 | A1 | 9/2002 | Mennie et al. ............. 382/135 |
| 6,076,826 | A | 6/2000 | Gerlier et al. ................ 271/274 | 2002/0145035 | A1 | 10/2002 | Jones ........................... 235/379 |
| D427,623 | S | 7/2000 | Kuwada et al. ................ D18/3 | 2002/0154806 | A1 | 10/2002 | Jones et al. ................. 382/135 |
| 6,097,834 | A | 8/2000 | Krouse et al. ............... 382/137 | 2003/0006277 | A1 | 1/2003 | Maskatiya et al. ........... 235/379 |
| 6,101,266 | A | 8/2000 | Laskowski et al. ........ 382/135 | 2003/0009420 | A1 | 1/2003 | Jones ........................... 705/39 |
| 6,105,007 | A * | 8/2000 | Norris ......................... 705/38 | 2003/0015395 | A1 | 1/2003 | Hallowell et al. ............ 194/206 |
| 6,119,946 | A | 9/2000 | Teicher ....................... 235/492 | 2003/0015396 | A1 | 1/2003 | Mennie ....................... 194/206 |
| 6,128,402 | A | 10/2000 | Jones et al. ................. 382/135 | 2003/0059098 | A1 | 3/2003 | Jones et al. ................. 382/135 |
| 6,131,718 | A | 10/2000 | Witschorik ................. 194/206 | 2003/0062242 | A1 | 4/2003 | Hallowell et al. ............ 194/302 |
| 6,141,438 | A | 10/2000 | Blanchester ................ 382/140 | 2003/0080032 | A1 | 5/2003 | Heidel et al. ................ 209/534 |
| 6,220,419 | B1 | 4/2001 | Mennie ....................... 194/207 | 2003/0081824 | A1 | 5/2003 | Mennie et al. ............. 382/135 |
| 6,237,739 | B1 | 5/2001 | Mazur et al. ................ 194/207 | 2003/0099379 | A1 | 5/2003 | Monk et al. ................. 382/115 |
| 6,241,069 | B1 | 6/2001 | Mazur et al. ................ 194/207 | 2003/0108233 | A1 | 6/2003 | Raterman et al. ........... 382/135 |
| 6,256,407 | B1 | 7/2001 | Mennie et al. ............. 382/135 | 2003/0121752 | A1 | 7/2003 | Stromme et al. ............ 194/207 |
| 6,278,795 | B1 | 8/2001 | Anderson et al. ........... 382/135 | 2003/0121753 | A1 | 7/2003 | Stromme et al. ............ 194/207 |
| 6,283,366 | B1 | 9/2001 | Hills et al. ................... 235/379 | 2003/0132281 | A1 | 7/2003 | Jones et al. ................. 235/379 |
| 6,311,819 | B1 | 11/2001 | Stromme et al. ............ 194/207 | 2003/0139994 | A1 | 7/2003 | Jones ........................... 705/36 |
| 6,318,537 | B1 | 11/2001 | Jones et al. ................. 194/346 | 2003/0168308 | A1 | 9/2003 | Maier et al. ................. 194/207 |
| 6,351,551 | B1 | 2/2002 | Munro et al. ............... 382/135 | 2003/0174874 | A1 | 9/2003 | Raterman et al. ........... 382/135 |
| 6,354,491 | B2 | 3/2002 | Nichols et al. .............. 235/379 | 2003/0182217 | A1 | 9/2003 | Chiles ......................... 705/35 |
| 6,363,164 | B1 | 3/2002 | Jones et al. ................. 382/135 | 2003/0198373 | A1 | 10/2003 | Raterman et al. ........... 382/135 |
| 6,371,303 | B1 | 4/2002 | Klein et al. ................. 209/534 | 2003/0202690 | A1 | 10/2003 | Jones et al. ................. 382/139 |
| 6,373,965 | B1 | 4/2002 | Liang .......................... 382/112 | 2004/0003980 | A1 | 1/2004 | Hallowell et al. ............ 194/206 |

| | | | | | | |
|---|---|---|---|---|---|---|
| 2004/0016621 | A1 | 1/2004 | Jenrick et al. ............... 194/206 | WO | WO 94/06102 | 3/1994 |
| 2004/0016797 | A1 | 1/2004 | Jones et al. ................. 235/379 | WO | WO 94/16412 | 7/1994 |
| 2004/0028266 | A1 | 2/2004 | Jones et al. ................. 382/135 | WO | WO 94/19773 | 9/1994 |
| 2004/0083149 | A1 | 4/2004 | Jones ......................... 705/35 | WO | WO 95/24691 | 3/1995 |
| 2004/0145726 | A1 | 7/2004 | Csulits et al. ................ 356/71 | WO | WO 95/10088 | 4/1995 |
| 2004/0149538 | A1 | 8/2004 | Sakowski ................... 194/207 | WO | WO 95/19019 | 7/1995 |
| 2004/0153408 | A1 | 8/2004 | Jones et al. ................... 705/43 | WO | WO 95/24691 | 9/1995 |
| 2004/0154964 | A1 | 8/2004 | Jones ......................... 209/534 | WO | WO 96/10800 | 9/1995 |
| 2005/0108165 | A1 | 5/2005 | Jones et al. ................... 705/43 | WO | WO 96/10800 | 4/1996 |
| 2006/0054454 | A1 | 3/2006 | Oh ............................. 194/207 | WO | WO 96/36933 | 11/1996 |

FOREIGN PATENT DOCUMENTS

| | | | | | |
|---|---|---|---|---|---|
| EP | 0 071 421 | 2/1983 | WO | WO 97/29459 | 8/1997 |
| EP | 0 077 464 | 4/1983 | WO | WO 97/30422 | 8/1997 |
| EP | 0 083 062 | 7/1983 | WO | WO 97/43734 | 11/1997 |
| EP | 0 030 413 B1 | 2/1984 | WO | WO 97/45810 | 12/1997 |
| EP | 0 101 115 | 2/1984 | WO | WO 98/12662 | 3/1998 |
| EP | 0 109 743 | 5/1984 | WO | WO 98/13785 | 4/1998 |
| EP | 0 185 200 | 6/1986 | WO | WO 98/24041 | 6/1998 |
| EP | 0 253 935 | 1/1988 | WO | WO 98/24052 | 6/1998 |
| EP | 0 314 312 | 5/1989 | WO | WO 98/24067 | 6/1998 |
| EP | 0 325 364 | 7/1989 | WO | WO 98/26364 A1 | 6/1998 |
| EP | 0 338 123 | 10/1989 | WO | WO 98/35323 | 8/1998 |
| EP | 0 342 647 | 11/1989 | WO | WO 98/40839 | 9/1998 |
| EP | 0 402 627 | 12/1990 | WO | WO 98/47100 | 10/1998 |
| EP | 0 416 916 | 3/1991 | WO | WO 98/48383 | 10/1998 |
| EP | 0 416 960 A1 | 3/1991 | WO | WO 98/48384 | 10/1998 |
| EP | 0 578 875 | 1/1994 | WO | WO 98/48385 | 10/1998 |
| EP | 0 583 526 | 2/1994 | WO | WO 98/50892 | 11/1998 |
| EP | 0 583 723 | 2/1994 | WO | WO 98/51082 | 11/1998 |
| EP | 0 593 209 A2 | 4/1994 | WO | WO 98/59323 | 12/1998 |
| EP | 0 593 209 A3 | 4/1994 | WO | WO 99/00776 | 1/1999 |
| EP | 0 613 107 | 8/1994 | WO | WO 99/09511 | 2/1999 |
| EP | 0 616 296 A2 | 9/1994 | WO | WO 99/14668 | 3/1999 |
| EP | 0 616 296 A3 | 9/1994 | WO | WO 99/23601 | 5/1999 |
| EP | 0 633 533 | 1/1995 | WO | WO 99/41695 | 8/1999 |
| EP | 0 633 552 | 1/1995 | WO | WO 99/48040 | 9/1999 |
| EP | 0 633 553 | 2/1995 | WO | WO 99/48042 | 9/1999 |
| EP | 0 473 106 B1 | 4/1995 | WO | WO 99/50796 | 10/1999 |
| EP | 0 671 696 | 9/1995 | WO | WO 00/24572 | 5/2000 |
| EP | 0 612 042 A3 | 5/1996 | WO | WO 00/58876 A1 | 10/2000 |
| EP | 0 718 809 A2 | 6/1996 | WO | WO 01/08108 | 2/2001 |
| EP | 0 612 042 B1 | 6/1998 | WO | WO 01/59685 | 8/2001 |
| EP | 0 548 142 B2 | 9/1999 | WO | WO 01/59723 | 8/2001 |
| EP | 0 632 415 B1 | 9/1999 | WO | WO 02/29735 | 4/2002 |
| EP | 0 708 419 B1 | 1/2000 | WO | WO 02/054360 | 7/2002 |
| EP | 0 824 736 B1 | 3/2000 | WO | WO 03/005312 | 1/2003 |
| EP | 0 984 410 A1 | 3/2000 | WO | WO 03/028361 | 4/2003 |
| EP | 0 686 292 B1 | 7/2000 | WO | WO 03/029913 | 4/2003 |
| EP | 1 028 359 | 8/2000 | WO | WO 03/030113 | 4/2003 |
| EP | 0 760 987 B1 | 9/2000 | WO | WO 03/067532 | 8/2003 |
| EP | 1 041 523 A2 | 10/2000 | WO | WO 03/107282 | 12/2003 |
| EP | 1 134 704 | 9/2001 | WO | WO 2004/010367 | 1/2004 |
| EP | 1 160 737 | 12/2001 | WO | WO 2004/027717 | 4/2004 |
| FR | 2 539 898 | 7/1984 | WO | WO 2004/036508 | 4/2004 |
| FR | 2 722 316 | 1/1996 | WO | WO 2004/038631 | 5/2004 |
| GB | 2 038 063 | 7/1980 | WO | WO 2004/068422 | 8/2004 |
| GB | 2 190 996 | 12/1987 | | | |
| GB | 2 204 166 | 11/1988 | | | |
| GB | 2 272 762 | 5/1994 | | | |
| GB | 2 355 522 | 4/2001 | | | |
| JP | 62-220843 | 9/1987 | | | |
| JP | 2-12492 | 1/1990 | | | |
| JP | 4-243497 | 8/1992 | | | |
| WO | WO 85/02148 | 5/1985 | | | |
| WO | WO 87/06041 | 10/1987 | | | |
| WO | WO 90/07165 | 6/1990 | | | |
| WO | WO 91/11778 | 8/1991 | | | |
| WO | WO 92/14221 | 8/1992 | | | |
| WO | WO 92/16931 | 10/1992 | | | |
| WO | WO 92/17394 | 10/1992 | | | |
| WO | WO 93/23824 | 11/1993 | | | |

OTHER PUBLICATIONS

'The Next Generation of ATM Network Survival' ATM Cardpay Shows Switches How to Win Bill Presentment/Payments Market EFT Report. New York: Aug. 27, 1997. vol. 20, Iss. 17; p. 1.*
elcom.com and VISA Announce Systems Link to Offer B2B Ecommerce Solutions PR Newswire. New York: Nov. 29, 1999. p. 1.*
Currency System International: Description of CSI CPS 600 and CPS 900 devices, 1 page (date: estimated 1994).
Mosler/Toshiba CF-420 brochure, "Wouldn't It Be Great . . . ," 4 pages (© 1989).
Translation of EP 0077464.
Translation of EP 0342647.
Elston, Cassius, "No More Lines . . . Self Serve Cash-Out," Drop Stream Developments, p. 3 (date prior to May 13, 1996).
AFB Currency Recognition System, 1 page (1982).

Barton, Louis L., "Check Processing Operations," Cover page, copyright page, Chapter 8 and Appendix 2, pp. 119-140 and 225-231 (1994).
Brandt, Mach 7 High-Speed Coin Sorter/Counter, 2 pages (Apr. 1, 1993).
Brandt, Model 8904 Upfeed, High Speed 4-Denomination Currency Dispenser, 2 pages (date prior to May 1996).
Cummins-Allison Corp., Operating Instructions for JetScan Currency Scanner/Counter Model 4061, 47 pages (Apr. 20, 1993).
Cummins-Allison Corp., Operating Instructions for JetScan Currency Scanner/Counter Model 4062, 58 pages (Nov. 28, 1994).
Cummins-Allison Corp., Operating Instructions for JetSort® High Speed Sorter/Counter Kits I & J, 11 pages (1993).
Cummins-Allison Corp., Operator's Manual for JetScan Currency Scanner/Counter Model 4060, 43 pages (Aug. 1991).
Cummins-Allison Corp., Sale of JetScan Currency Scanner/Counter Model 4060, 1 page (Aug. 1991).
Cummins-Allison Corp., Sale of JetScan Currency Scanner/Counter Model 4061, 1 page (Apr. 20, 1993).
Cummins-Allison Corp., Sale of JetScan Currency Scanner/Counter Model 4062, 1 page (Nov. 28, 1994).
Currency Systems International, Incorporated, Medium Speed Currency Sorting Family CPS 600 and CPS 900, 4 pages (1994).
Currency Systems International, Mr. W. Kranister in Conversation With Richard Haycock, 5 pages (Apr. 1994).
Currency Systems International, Inc., Currency Processing System CPS 300, 4 pages (1992).
De La Rue Garny GmBH, Cash Depositing Systems CDS 5700 and CDS 5800, 7 pages (date unknown, with translation).
Glory, General Catalog of Products, System 8000, 2 pages (1996).
Glory, GFB-200/210/220/230 Desk-Top Bank Note Counter, 2 pages (estimated date prior to Aug. 9, 1994).
Glory, GSA-500 Sortmaster, 2 pages (Jan. 14, 1994).
Glory, The New CRS-8000 Cash Redemption System, 1 page (date prior to May 13, 1996).
Glory, UF-1D, 2 pages (estimated date prior to Aug. 9, 1994).
ISH Electronic, ISH 12005/500 SB-Münzähler, 4 pages (date prior to May 13, 1996, with translation).
Mosler, Inc., Operator's Manual for CF-420 Cash Settlement System, 149 pages (1989).
Mosler, revised drawings of portions of CF-420 Cash Management System (Figs. A-C) and description of same, 4 pages (1989).
NGZ Geldzählmaschinengesellschaft, NGZ 2100, 4 pages (date prior to May 13, 1996).
Perconta, Contomat, 2 pages (date prior to May 13, 1996).
PREMA GmbH, 405 (RE) Self Service Coin Deposit Facility, 2 pages (date prior to May 13, 1996).
Reis Eurosystems, Cash Receipt Systems CRS 6501/CRS 6510, 4 pages (Feb. 1995).
Scan Coin, Inc., CDS 600 Cash Deposit System, 2 pages (Jun. 15, 1994).
Scan Coin, Inc., CDS 640 Cash Deposit System, 2 pages (Jun. 15, 1994).
Vector Videotape (no date).
Discussion of FR 2 722 316 in European Patent Office, Communication pursuant to Article 96(2), EP 04 020 193.1, Jul. 18, 2005, 4 pages.
Brochure for Shinwoo Banking Machine; downloaded on Mar. 30, 2009; 2 pages.
Brochure for SB-1000 Currency Discrimination Counter with Enhanced Image Recognition Technology; downloaded on Mar. 30, 2009; 1 page.
Brochure for MLS Bank Machine; downloaded on Mar. 30, 2009; 4 pages.
Web pages for SB 5000 (Digital Fitness Sorter) downloaded on Mar. 30, 2009; 3 pages.
Web pages for SB 1000 (Currency Discrimination Counter; downloaded on Mar. 30, 2009; 3 pages.
Brochure for SBM Banking Machine SB Series; downloaded on Mar. 30, 2009; 2 pages.

* cited by examiner

AUTOMATED PAYMENT SYSTEM AND METHOD

BACKGROUND OF THE INVENTION

Currently, when a customer receives an invoice from a company, a check is usually written for the invoice and then sent in the mail with the payment stub or invoice. Often, these payments go to a post office box number. These post office box numbers are often located at a bank and are commonly known as "lock boxes." Bank personnel receive the payments, deposit the checks into the company's account, and forward the invoices to the company for reconciliation purposes. The check is then routed through the Federal Reserve Bank system to the bank of the customer. This whole process can take up to a week or more before the customer's account at the company is credited. Such a long processing time can cause the customer to be charged with late fees and/or interest on the unpaid amount. Also, the long processing time may adversely affect the company, as it is dependent on the mail to receive payments to its account. Also, the company has to deal with angry customers who demand that late charges and interest fees be reversed.

Some banks provide invoice payment services for customers who travel frequently. The bills are forwarded directly to the bank, and an employee of the bank writes the check or debits the customer's account for the payment. Because the customer's bank may not be the bank of the company, however, the bills still need to be mailed to the lock box for processing.

Another method recently instituted by some banks and companies is payment via the internet. Such systems vary, but there are two main methods. In one method, a customer enters the company's website and selects a payment option. The customer may then enter important data such as name, address, e-mail address, and the account number they wish to have credited. Also, the customer must provide authorization for the transaction to occur and supply information regarding from where the payment should be debited, i.e., bank name and routing number and account name and number. After the program is established, the user may pay bills on-line. This method takes time (up to three or four days), however, because the company must first send a request to the customer's bank and then wait for the bank to send the funds and for the receiving bank to process the transfer of funds.

The other method of paying on-line is utilized by the customer accessing his or her bank account and sending the information that way. In this system, the bank of the customer processes the transaction on-line and electronically transfers the funds to the company. This process is usually faster because the customer's bank is immediately sending the funds instead of waiting for a request from the company. This method also, however, has drawbacks. First, not all people have access to the internet. Although many people have computers, large segments of the population do not or do not know how to use the internet. Second, due to security issues, not all people who have access to the internet feel comfortable accessing accounts on-line. Some people do not want to provide account numbers on the internet for fear of hackers obtaining such information.

Also, the customer must still wait until they receive the invoice and must enter in the information every month.

Another drawback of current payment systems is that customers may only use them to pay companies that are on the internet and are established to receive payments in such a manner. For many smaller companies and individuals, the above-mentioned devices cannot be used.

In view of these problems, there is a need for a system which provides a customer with a method of faster payment of bills while ensuring the confidentiality of account numbers and the like. There is also a need for a method of payment where the customer does not need to enter payment information every month.

SUMMARY OF THE INVENTION

According to one embodiment of the present invention, an automated payment system for processing payment by a customer to a company is provided. The payment system includes a document scanning system, which has an input receptacle adapted to accept a document. After receiving an authorization agreement from the customer, the scanner acquires at least one image from the document. Also provided is a first computer adapted to receive images from the document scanning system. Adapted to communicate information represented by the image, a first communication link couples the document scanning system and the first computer. The payment system also includes a second computer adapted to receive images which is in communication with the first computer via a second communication link. The second communication link is adapted to communicate images and payment information.

BRIEF DESCRIPTION OF THE DRAWINGS

The foregoing and other advantages of the invention will become apparent upon reading the following detailed description and upon reference to the drawings.

Figure 1:
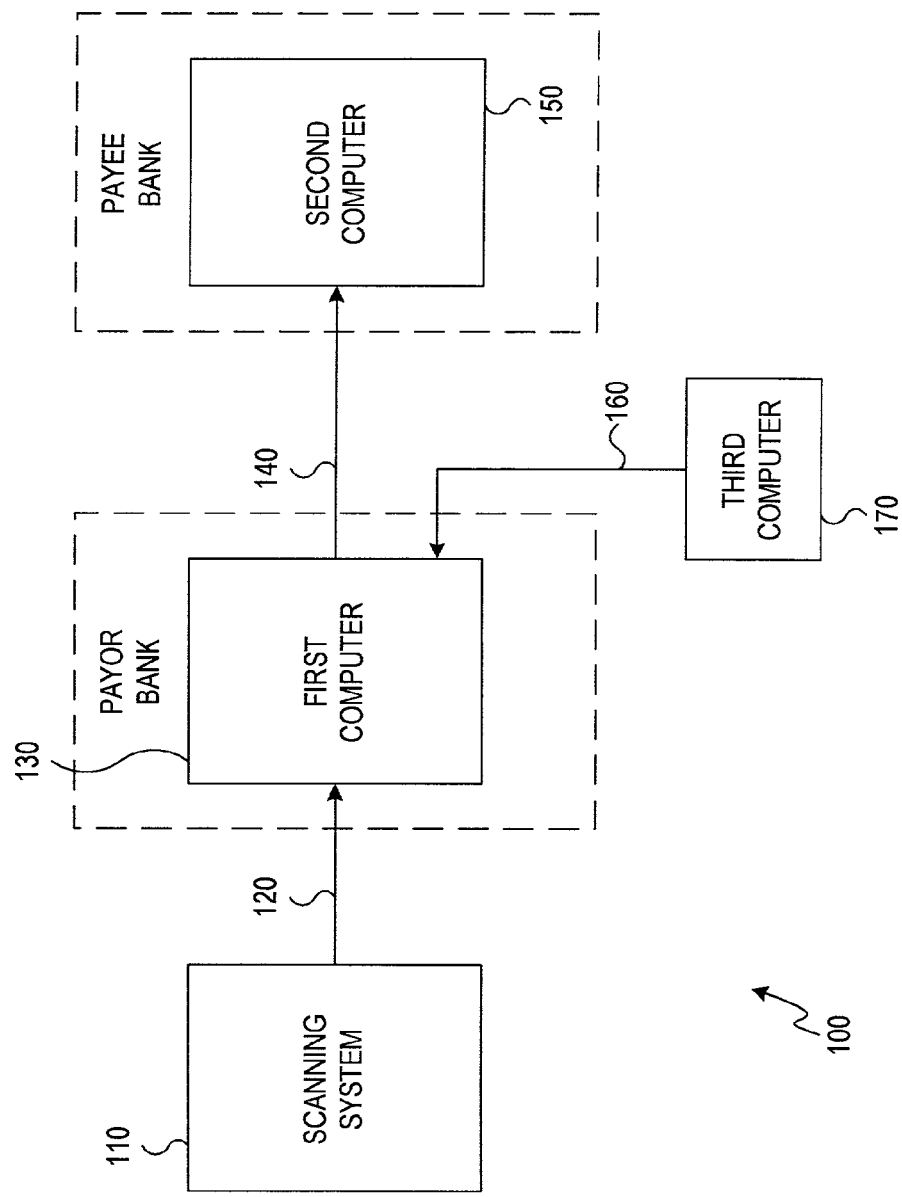
FIG. 1 is a block diagram of the components of an automated payment system according to principles of an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Customers write out and mail numerous checks in a month. These checks are written to payees for any number of reasons. The check may be to a company to pay a bill or invoice, or it may be written to a person as a gift. The term "customers" refers to any person or business that receives invoices requesting payment from anyone, a person or an entity. The term "payee" refers to whom the money is owed or to whom it is being paid. The term "payee," as used in this application, refers to any person or business who provides services and/or goods to a customer or to anyone to whom a customer wishes to pay money (i.e., a grandchild for a birthday present). The payee may send an invoice to the customer for payment. The term "invoice" refers to any sort of bill, payment coupon, remittance, or reminder notice of payment due for goods or services rendered. As described above in the background, this method of paying invoices often takes a great amount of time and is inefficient. In one embodiment of the present invention, the invoices or bills are mailed directly to a payment center for processing. The term "payment center" includes banks, savings and loans, investment houses, and all other types of financial institutions, whether private, public, or government, as well as including any other business that would provide this service, such as a currency exchange, department or other retail store, or places that normally accept bill payments. For ease of description, the following embodiments will be described in terms of banks, but it is understood that all other payment centers are contemplated.

Turning now to FIG. 1, a block diagram of an automated payment system 100 of the present invention is illustrated. The automated payment system 100 includes a document scanning system 110, which is capable of receiving documents. The term "documents" includes currency bills, financial institution documents, and other documents with predetermined fields. The term "currency bills" includes not only U.S. and foreign currency, but also currency created by corporations such as casino script and "Disney Dollars." The term "financial institution documents" includes checks, deposit slips, loan payment documents, cash tickets, savings withdrawal tickets, check deposit slips, savings deposit slips, and all other documents utilized as a proof of deposit at financial institutions. The term "documents" may also include invoices and other reminders received from companies requesting payment (such as collection notices and e-mail reminders).

In FIG. 1, the document scanning system 110 scans the documents and obtains images of the documents. The document scanning system is connected via a first communication link 120 to a first computer 130. The first communication link 120 is adapted to transmit information, such as the images, between the scanning system 110 and the first computer 130. The first communication link 120 may be any link used for data, voice, or video communications that is known in the art, such as a telephone line. Alternatively, the first communication link 120 may be over another form of media, such as a radio or microwave link.

The first computer 130 is a computer at a bank where the payor, or person receiving the invoice, has an account. The first computer 130 is adapted to receive information through the first communication link 120 and to update the payor's account accordingly (i.e., credit or debit the account). The first computer 130 may be located in the same place as the document scanning system 110, or it may be in a location remote, or separate, from the document scanning system 110. For example, it is contemplated that the document scanning system 110 and the first computer 130 may be located in the same building. It is also contemplated that the document scanning system 110 may be located at a branch of the payor bank, while the first computer 130 is located at the main office or processing center of the payor bank.

The first computer 130 of the payor bank is then linked via a second communication link 140, which is defined the same as above, to a second computer 150 at a payee bank. The payee bank is a bank having an account owned by the payee. The second communication link 140 allows the payor bank to communicate with the payee bank. In this embodiment, images obtained from the scanning system 110 may be transferred to the first computer 130 for debiting the customer's account and then transferred to the second computer 150 for crediting the payee's account. The images are transferred over the communication lines 120, 140. These transfers may occur substantially immediately. For example, an image that is scanned on a Monday morning may be electronically transferred to the receiving bank that day for crediting to the company's account within minutes. Alternatively, the transaction may occur within a couple of hours, depending on the speed of transmission and auditing requirements. In other embodiments, the payee and payor banks may have predetermined time periods established for the transfer of images. For example, the payor bank may send image transmissions once every hour, once a shift, or once a certain number of images have been obtained.

In another embodiment, the first computer 130 is linked via a communication line 160, as defined above, to a third computer 170 operated by the customer or payee. Information may be forwarded from the payor bank to the customer or payee. For example, images from the scanning system may be e-mailed to either the customer or the payee. In another embodiment, the images may not be transmitted, but a receipt indicating that the transaction occurred may be e-mailed. In another embodiment, the images may be downloaded onto a disk or a tape by either the payee or payor bank and forwarded to the customer or payee in this manner, as well. In this embodiment, the automated payment system 100 is useful because it provides the company, customer, or both with a detailed record of the transaction soon after the transaction occurs. If the image is sent to the company, the company may update their records faster than if the receipts were merely mailed to them.

In other embodiments, the third computer is operated by the customer and a fourth computer operated by the payee is included. Also, the third and fourth computers 170 may be linked to the second computer 150 instead of or in addition to the first computer 130. In all of these embodiments, the operation of the system is the same.

Figure 2:
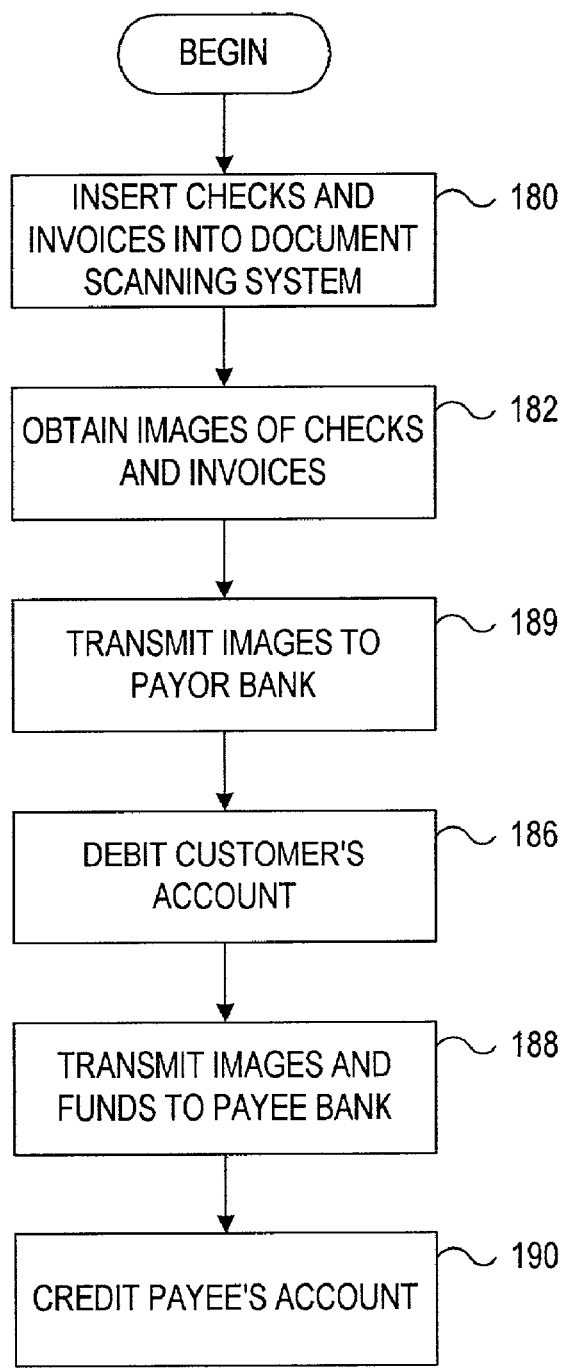
FIG. 2 is a flowchart describing the operation of an automated payment system according to principles of another embodiment of the present invention.

Turning now to FIG. 2, a brief description of how the embodiment described above operates will be described. First, at step 180, a check drawn on an account owned by a customer and an invoice are inserted into the scanning system. The check and invoice may be inserted as part of a stack or singularly. Images of the check and invoice are then obtained by the scanning system (step 182). Next, at step 184, the images are transmitted to a payor bank which holds the account owned by the customer. At step 186, the customer's account is then debited for the amount of the check. The images of the check and invoice, along with the funds debited from the customer's account, are transmitted at step 188 to a payee bank. The payee bank holds an account belonging to a payee listed on the check. Then, at step 190, the payee bank credits the payee's account with the funds received from the payor bank.

Figure 3:
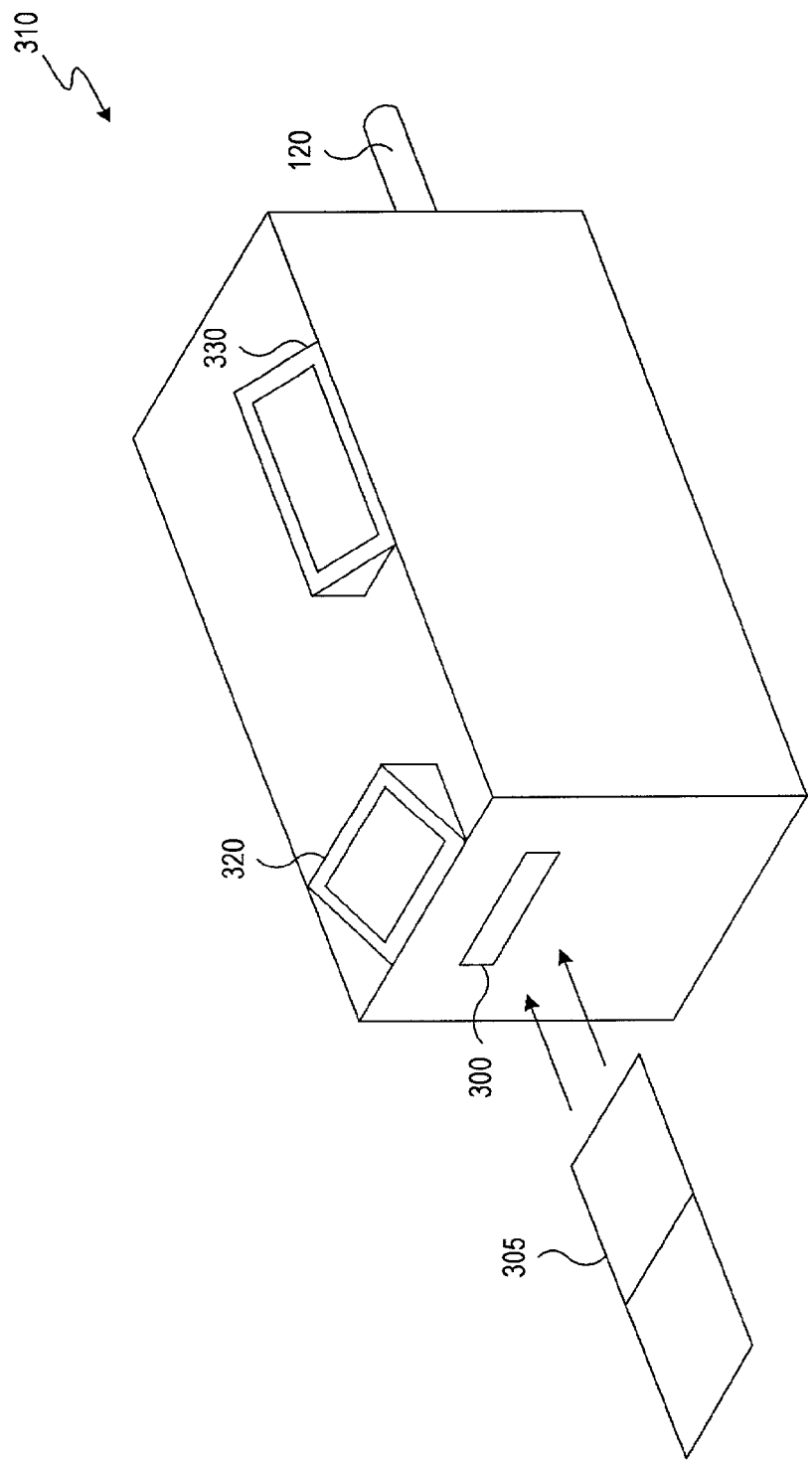
FIG. 3 is a perspective view of a document scanning system according to principles of an embodiment of the present invention.

Turning now to FIG. 3, a perspective view of one embodiment of a document scanning system 310 is depicted. The scanning system includes an input receptacle 300 adapted to receive a document 305. Information concerning the transaction may be communicated to an operator via an operator control panel 320, such as a display, a touch screen, or a video screen. The operator is a person employed or contracted by the bank to run the scanning system 310. The operator control panel 320 can be a touch screen which can be used by the operator to communicate interactively with the first computer 130 (FIG. 1). For example, the operator control panel 320 can also be a communicational video screen which displays video images of the document 305 as the document 305 is scanned. The operator control panel 320 may then prompt the operator to perform the next step, e.g., accept, reject, retry.

In the embodiment described above, there are situations when the customer is present as the operator scans the document 305. In such an embodiment, a customer control panel 330 may be provided to display information to a customer. The customer control panel 330 may also be a display, a video screen, or a touch screen as described above. In one embodiment, the customer control panel 330 includes a touch screen button for authorizing the transaction. Also, there may be a separate "OK" button. In other embodiments, the control panels 320, 330 may also have numeric keypads, standard keyboards, and/or denomination keys for inputting information into the document scanning system 310. For example, if a document has information that is unable to be scanned or if the information scanned is unreadable and/or unable to be deciphered, the control panels 320, 330 may be used to input the missing information into the scanning system 310. In an alternative embodiment, the control panels 320, 330 also include electronic signature pads and pens. The electronic signature pads and pens also enable operators and users to input information into the scanning system 310 if it is needed.

Figure 4:
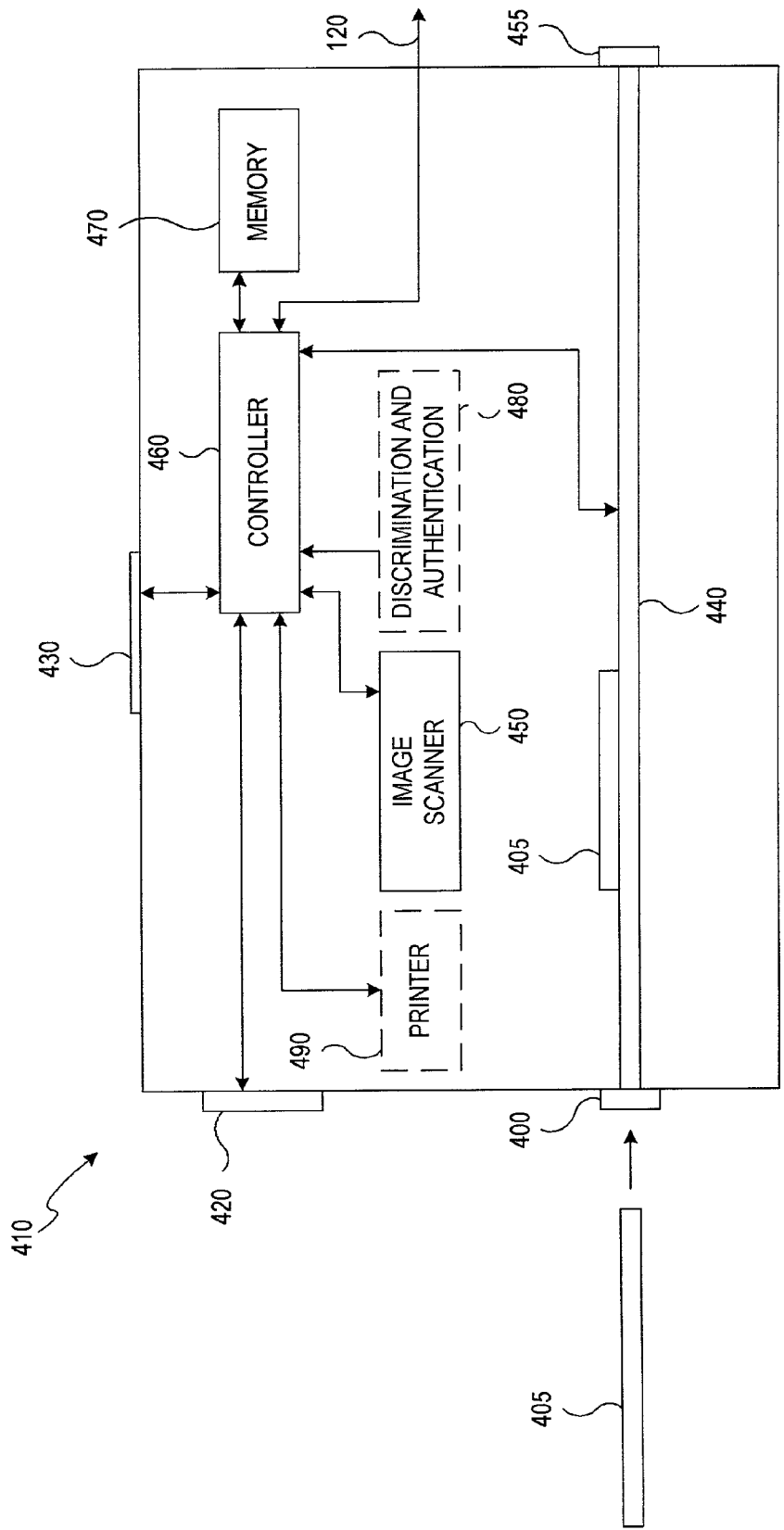
FIG. 4 is a functional block diagram of a document scanning system according to one embodiment of the present invention.

Turning now to FIG. 4, a functional block diagram of one embodiment of a document scanning system 410 will now be described. As mentioned with reference to FIG. 3, a document 405 is placed into the document scanning system 410 through an input receptacle 400. The document 405 may be placed into the input receptacle 400 one at a time or may be placed in a stack. A transport mechanism 440 transports the documents 405 one at a time from the input receptacle 400 past an image scanner 450 to an output receptacle 455. In this embodiment, only one output receptacle 455 is illustrated, but other embodiments include multiple output receptacles 310. A controller 460 is linked to the image scanner 450, the transport mechanism 440, a memory 470, and the operator and user control panels 220, 230. The controller 460 is adapted to control operation of the transport mechanism 440 and the image scanner 450, to communicate information to and from the memory 470, and to communicate information to and from the customer and operator control panels 320, 330.

Once the image scanner 450 receives an instruction from the controller 460, the image scanner 450 scans the document 405, and obtains an image of the document 405. The image may be an image of the entire document 405 (a full image) or it may be of selected portions of the document 405. The image scanner 450 may contain optical character recognition (OCR) software, such as character amount recognition (CAR) or legal amount recognition (LAR), for identifying the characters printed in one or more fields of the document 405. The OCR also recognizes certain fields within the document 405. For example, if the document 405 is a check, the OCR may search the full image for the account number, scan the account number once the field is located, and transfer the determined account number to the memory 470 through the controller 460 for storage. Alternatively, if the document 405 is an invoice, the OCR may search the full image for a dollar amount. Once the dollar amount field is located, the OCR will then scan the dollar amount and transfer an image of the dollar amount to the memory 470 for storage. In an alternative embodiment, the image scanner 450 is directly linked to the memory 470 for transfer and storage of the images.

The memory 470 may be used for either temporary or permanent storage of the images obtained by the image scanner 450. The memory 470 may store the images until the images are transported via the first communication link 120 to the first computer 130. The transportation may occur after a set number of images have been stored, after a predetermined amount of time, or when the memory 470 is full. Alternatively, the memory 470 may be used to store information on tapes, disks, and/or CD-ROMs. The customer may insert a memory storage device into the scanning system 410. After the image scanner 450 obtains images of the document 405 and communicates the images to the first computer 130, the scanning system 410 may save the images to the memory 470, which is then taken by the customer as a receipt. In another embodiment, the memory is removable, but is removed by the first bank for reconciliation purposes. In yet another alternative embodiment, any combination of memories 470 are included.

Next, the transport mechanism 440 may transport the document 405 past a discrimination and authentication unit 480. The discrimination and authentication unit 480 is of the type described in U.S. Pat. No. 5,915,592, which is incorporated herein by reference in its entirety. The discrimination and authentication unit 480 authenticates the document 405 and, in the case of a currency bill, determines the denomination of the bill. With other documents, such as checks, the system may capture information such as the check amount, account number, bank number, or check number. If a document cannot be authenticated or discriminated by the discrimination and authentication unit 480, an alert may be sent via one of the control panels 320, 330 to an operator or customer. In some embodiments, the controller 460 may cause a document that is unable to be authenticated to be flagged and then rejected from the machine. If the document scanning system 410 only has one output receptacle 455, the controller 460 may halt the operation of the machine while the document 405 is ejected into the output receptacle 455. In embodiments where the scanning system 410 has multiple output receptacles 455, the controller 460 may continue operation of the scanning system and merely reject the unauthenticated document 405 to one output receptacle, while authenticated documents are sent to a different output receptacle.

It is also contemplated that the discrimination and authentication unit 480 may not be used for all documents 405 that are input into the system 410. For example, the discrimination and authentication unit 480 may be used to process currency bills and checks, but may not be used in the case of invoice-type documents. In this situation, the discrimination and authentication unit 480 recognizes certain documents, such as an invoice or payment coupon, as being a type of document where no discrimination or authentication needs to be performed. In this case, after the discrimination and authentication unit 480 recognizes the invoice document, the transport mechanism 440 may transport the document to the output receptacle 455.

In another embodiment, it is also contemplated that the discrimination and authentication unit 480 is not included. In this embodiment, the document 405 would be transported past the image scanner 450 and to the output receptacle 455.

In another embodiment of the present invention, a printer 490 is included in the document scanning system 410. The printer 490 may perform a variety of functions. In one embodiment, the printer 490 may be used to print an indicia of cancellation or a "paid" indicia on the document 405. The type of mark used may depend on the type of document 405. For example, a check would have an indicia of cancellation on it, while the invoice may be marked "paid." In another embodiment, the printer 490 may be used to print an image of the check and/or invoice to be physically sent to the customer. The printer 490 used can be any type of conventional printer. For example, depending on the function for which the printer 490 is used, the printer 490 may use conventional printing wheels. In another embodiment, where the printer 490 is only used for one purpose, for example, to cancel the document 405, the printer 490 may be a stamp. In yet another embodiment, the printer 490 may include a series of stamps. For example, one stamp could imprint an indicia of cancellation on a check and another stamp could print "paid" on an invoice. The operation of the printer 490 is controlled by the controller 460.

Figure 5:
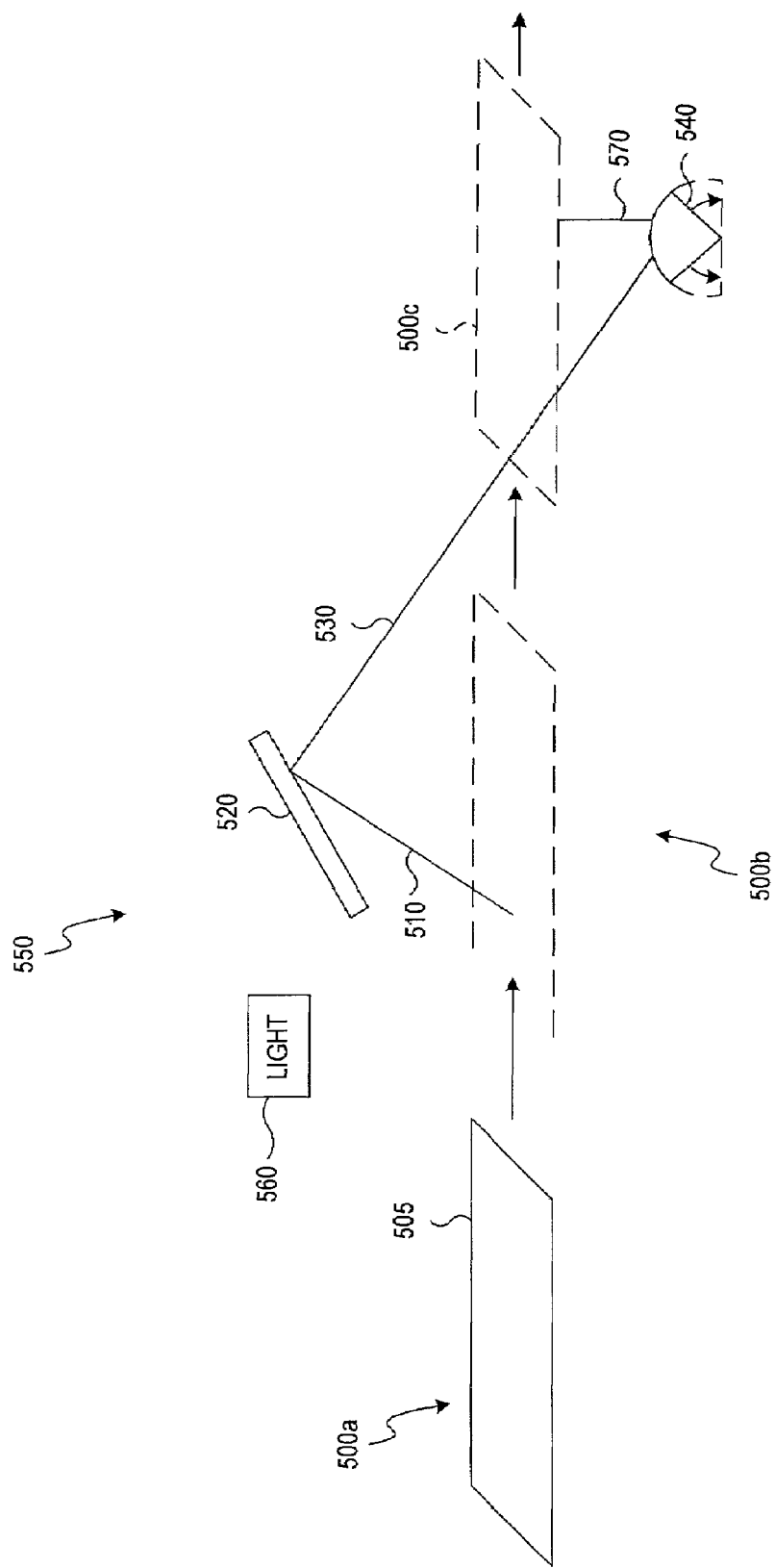
FIG. 5 is a functional block diagram of an image scanner of a document scanning system according to one embodiment of the present invention.

One example of the arrangement of an image scanner 550 for use in the above-mentioned embodiments is described with reference to FIG. 5. A document 505 having two sides, for example, a check, U.S. or foreign currency, or an invoice, is inserted into the document scanning system 310 (shown in FIG. 3) at position 500*a*. In the embodiment of FIG. 4, the image scanner 450 is adapted to scan both sides of the document 505. Often, the document 505 contains valuable information on both sides and, thus, obtaining an image of both sides is useful. For example, if the document 505 is a check, a first (or front) side of the check may contain payee and amount information, while a second (or back) side may contain endorsement information.

After the document 505 is inserted into the document scanning system 310, the document 505 is transported past a scanning arrangement by the transport mechanism 440 (FIG. 4). When the document 505 moves into a position 500*b*, it is illuminated by a light 560, causing the image of the first or second sides of the document to travel along a first path 510 to a mirror 520. The image is then reflected by the mirror 520 along a second path 530 to a scan head 540, where the image is obtained. The scan head 540 may be rotatable as shown.

The light 560 may be located in various places in the image scanner 450. Thus, one side of the document 505 is imaged using reflection techniques. The document 505 then moves into position 500*c* where the image of the other of the first and second sides of the document 505 is scanned by the scan head 540 via a path 570. In one embodiment, the transport mechanism 440 stops at the position 500*b* while, in other embodiments, the transport mechanism 440 operates in continuous motion and does not stop at the various positions for imaging.

The rotation and operation of the scan head 540 may be controlled by the controller 460 illustrated in FIG. 4. Alternatively, the scan head 540 could be rotated based on a time delay (rotates so many degrees every so often). The operation of the scan head 540 may also be in continuous operation. The scan head 540 may scan without interruption as opposed to an embodiment where the scan head 540 is turned on or off via the controller 460.

In accordance with another embodiment of the present invention, the image scanner 550 may be of the type disclosed in U.S. Pat. No. 4,888,812, which is incorporated herein by reference in its entirety.

Figure 6:
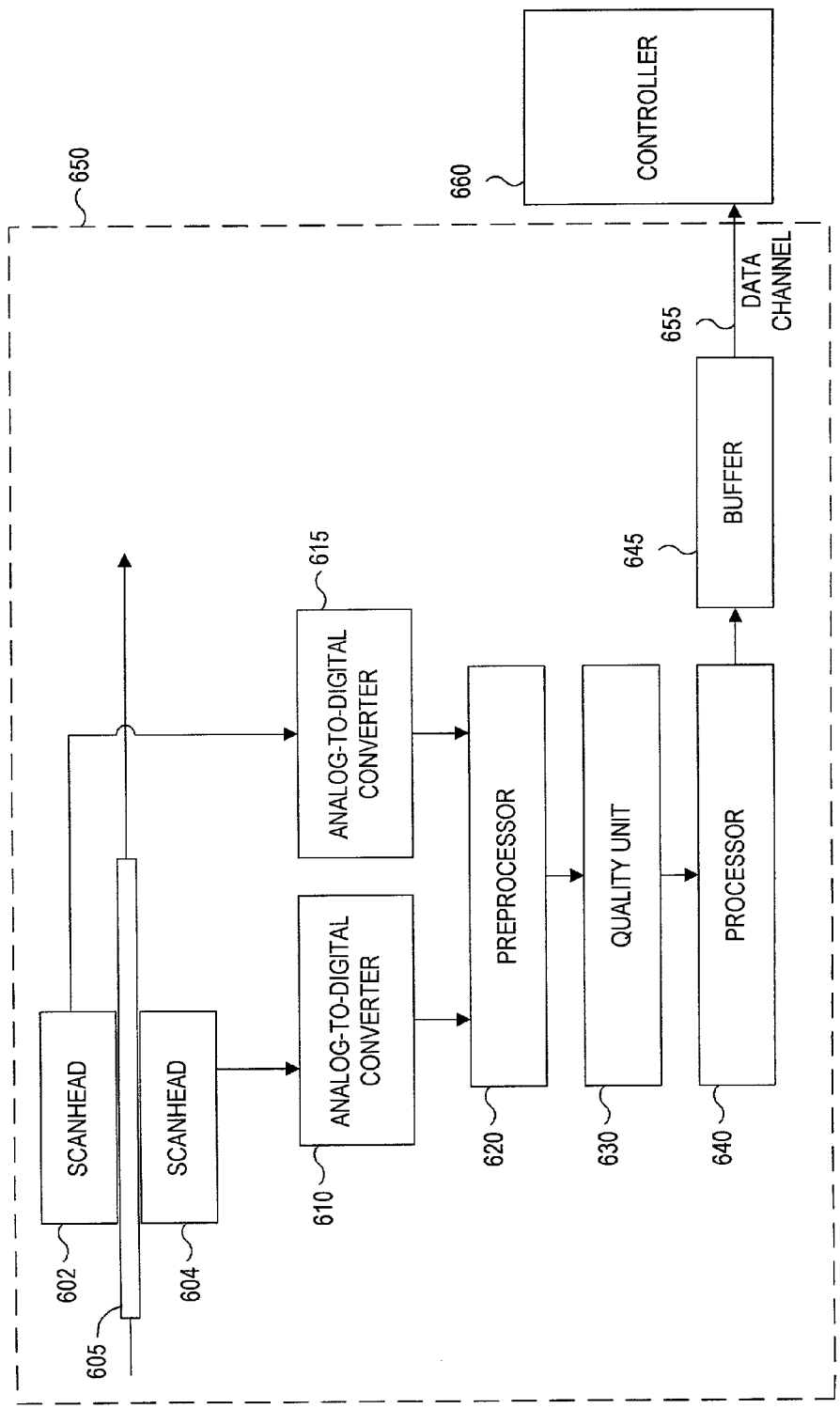
FIG. 6 is a functional block diagram of an image scanner according to another embodiment of the present invention.

In FIG. 6, another embodiment of an image scanner 650 is depicted. In this embodiment, the front and back surfaces of a document 605 are scanned by scan heads 602, 604 and the images are processed into video image data by electronic circuitry. The scan heads 602, 604 are preferably charge coupled scanner arrays and generate a sequence of analog signals representing light and dark images defining the image on the document 605. The scan heads 602, 604 are arranged for simultaneously scanning both the front and back of the document 605 and are connected respectively to analog-to-digital converters 610, 615 which convert the analog values into discrete binary gray scale values of, for example, 256 gray scale levels. Alternatively, the scan heads 602, 604 may be arranged in an offset, or non-overlapping, manner. For example, a non-overlapping arrangement may be useful in isolating light detected by each scan head. The scan heads 602, 604 may be capable of obtaining images of varying resolutions. The particular resolution chosen, which can be varied by the operator, is selected based on the type of document being scanned, as is known in the art.

In the embodiment illustrated in FIG. 6, the high resolution gray scale image data from the analog-to-digital converters 610, 615 is directed to an image data preprocessor 620 in which the data may be enhanced and smoothed and which serves to locate the edges of successive documents. Irrelevant data between documents can then be discarded. If the documents are slightly skewed, the image preprocessor 620 can also perform rotation on the image data to facilitate subsequent processing.

The image data may be monitored for unacceptable image quality by an image quality unit 630. For example, the image quality unit 630 may monitor the distribution of gray scale values in the image data and create a histogram. As is well known in the art, acceptable quality images have a distribution of gray scale values within certain prescribed limits. If the gray scale distribution of the histogram falls outside these limits, this is indicative of poor image quality and an error condition may be generated.

The image data is transmitted from the quality unit 630 to an image processor 640. The image processor 640 may add items to the image. For example, if a document bearing only a signature is scanned, the image processor 640 may add a transaction amount, a payee, and/or other information to the image. As is known in the art, the scan heads 602, 604 can additionally scan specified fields on the faces of the document. For example, when processing checks, the scan heads 602, 604 may be directed by the OCR software to search for the "$" symbol as a coordinate to the left of the numeric check amount field box. As is known in the art, a straight coordinate system or dimension system may be used where known dimensions of the box are used to locate the field. Also, when scanning currency, the scan heads 602, 604 may be directed by the OCR software to search for the serial numbers printed at defined locations which the image processor 640 can locate.

The processor 640 can be programmed to locate fields for various types of currency and perform processing. Based on scanning certain areas on the currency or document, the processor 640 first identifies the type of document, such as type of currency, for example, U.S. bank notes. Then, based on the outcome of the previous step, certain fields of interest are located, and the information is stored for use by the system. For checks, fields of interest may include the name of the bank, the account number, and the amount of the transaction. For U.S. bank notes, the fields of interest may include the dollar amount. For deposit slips, the fields of interest may include the bank name, account number, total amount of deposit, and amount of individual checks or currencies deposited. For invoices, the fields of interest may include the account number, the transaction amount, and the minimum amount due. The processor 640 may also compress the image data, as is known in the art, in preparation for transmission to an outside location and/or storage.

The amount of image data per document may vary depending on the size and nature of the document and the efficiency of the data compression and reduction for that particular document. To insure that no data is lost in the event that the volume of image data temporarily exceeds the transfer capacity of a data channel 655, such as a high speed data channel, a prechannel buffer 650 is interposed prior to the data channel 655, which is connected to a controller 660. The capacity of the pre-channel buffer 650 is continually monitored by the controller 660 so that appropriate action may be taken if the buffer becomes overloaded. The compressed video image data is received by the controller 660 over, for example, a high-speed data channel 760 and is initially routed to temporary storage. The prechannel buffer 650 is preferably of a size capable of storing image data from at least several batches or runs of checks or similar documents, each batch or run containing several checks or documents. The controller 660 in the document scanning system directs the image scanner to perform the functions of analyzing the data. Alternatively, as discussed above, analysis of the data can occur at an office computer or at a personal computer attached to the system.

A personal computer or alternate means may be used to create images of electronic documents that are electronic images only. That is, such documents may be created without scanning physical documents. In such a system, computer software electronically creates an image of a document such as a check. These systems are commonly known in the art. A special printer (not shown) may be connected to the system to print documents with fields of interest.

Other scanning modules and methods can be used in place or in addition to the ones described above. These include CCD array systems, multi-cell arrays, and other well-known scanning techniques. Examples of these techniques and devices are described in U.S. Pat. Nos. 5,023,782, 5,237,158, 5,187,750 and 4,205,780, all of which are incorporated herein by reference in their entireties. The scanning module can also be a color image scanner such as the type described in U.S. Pat. No. 5,335,292, which is incorporated herein by reference in its entirety.

Figure 7:
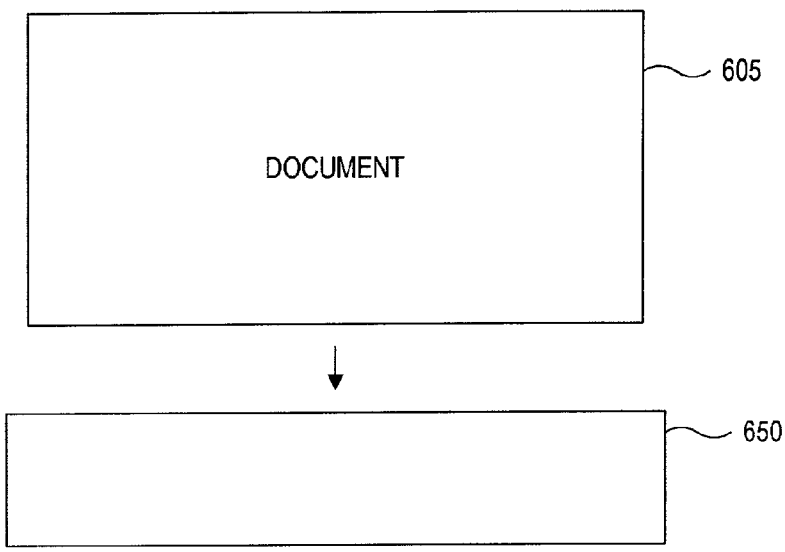
FIG. 7 is a top view of a document being scanned by an image scanner in the wide dimension.
Figure 8:
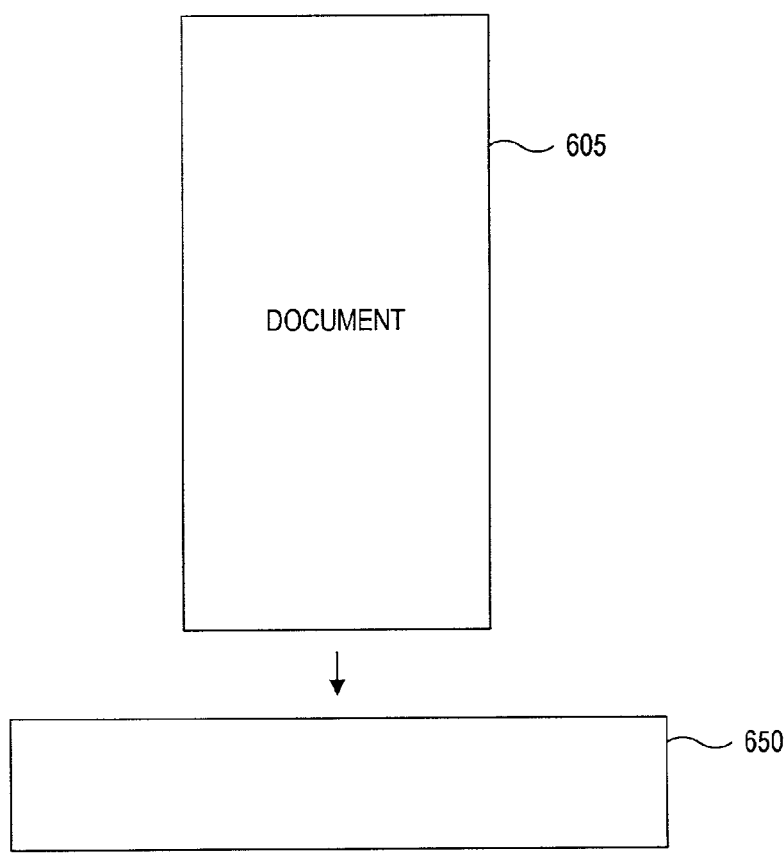
FIG. 8 is a side view of a document being scanned by an image scanner in the narrow dimension.

Turning now also to FIGS. 7 and 8, the document 605 may be transported past the image scanner 650 in a direction that is parallel to its narrow edge (FIG. 7), or the document 605 may be transported past the image scanner 650 in a direction that is perpendicular to its narrow edge (FIG. 8). These embodiments may be incorporated into both the embodiments of either of the image scanners depicted in FIGS. 5 and 6.

Figure 9:
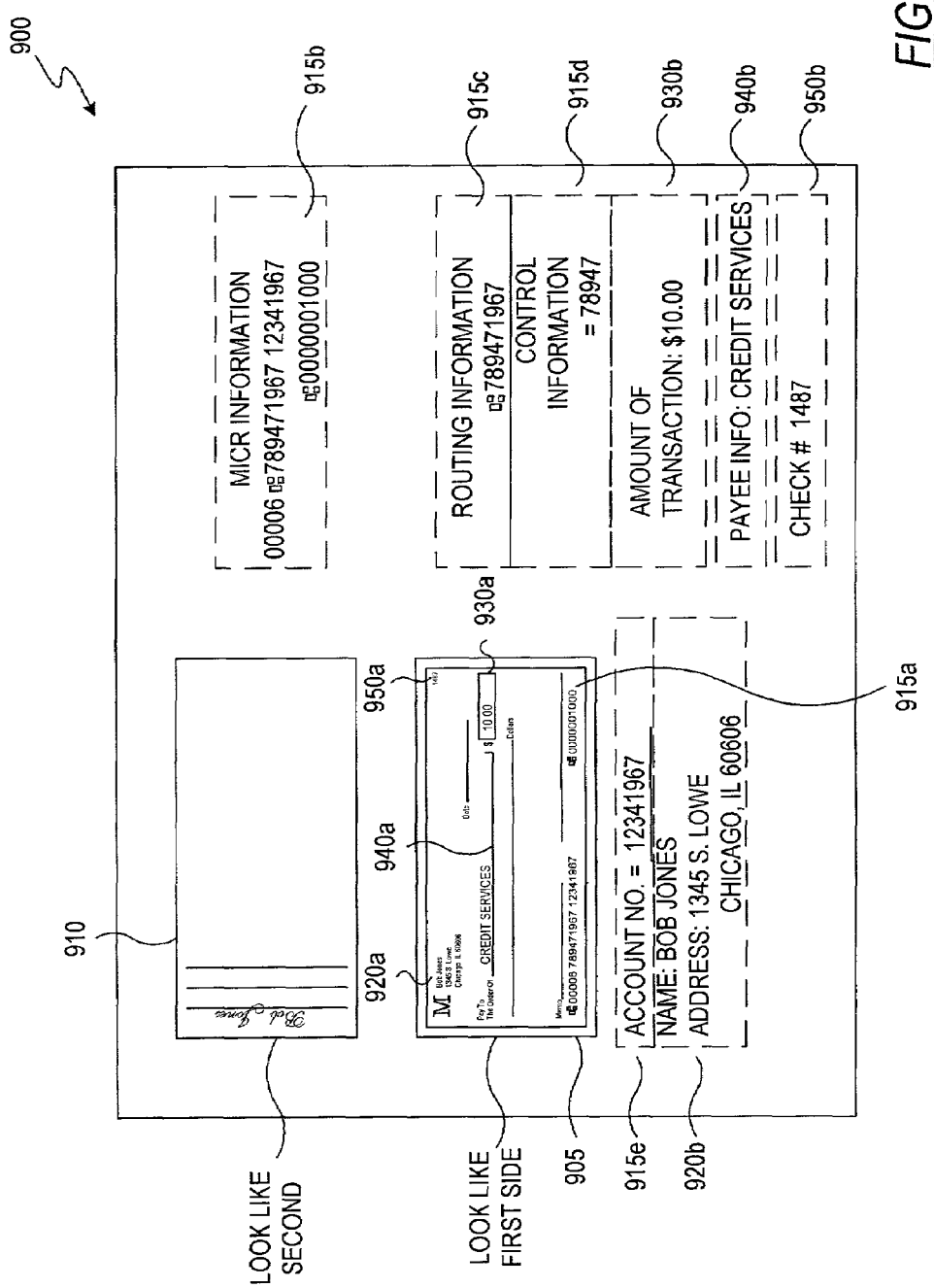
FIG. 9 is a block diagram of an image file of a check according to one embodiment of the present invention.
Figure 10:
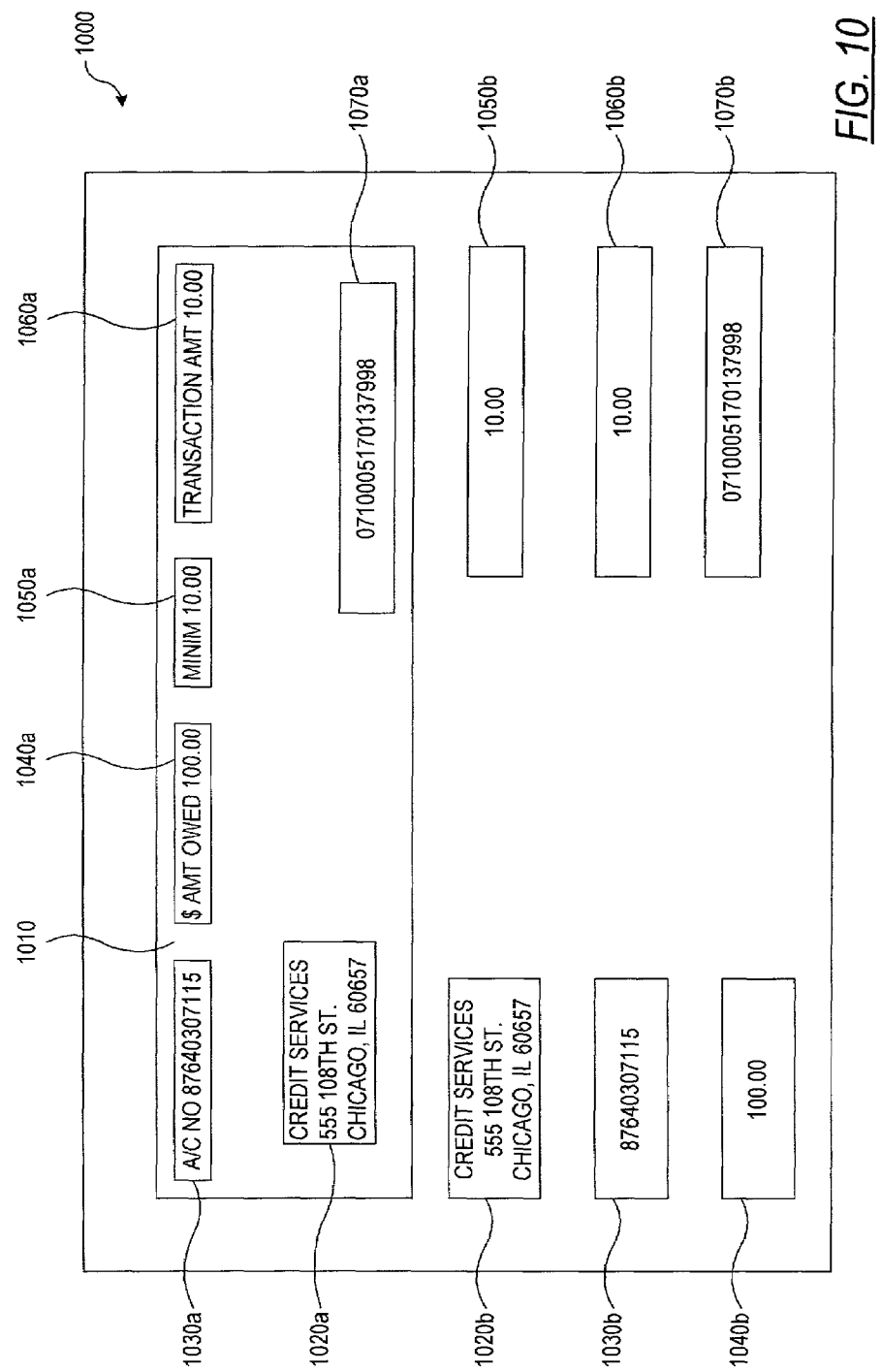
FIG. 10 is a block diagram of an image file of an invoice according to one embodiment of the present invention.

Turning now to FIGS. 9 and 10, an image file of a check and an image file of an invoice are described. Turning first to FIG. 9, a check image file 900 comprises several parts. A first image section 905 represents one side of a scanned check. The image is a collection of encoded data and is represented here pictorially so as to be readily understandable to those skilled in the art. In the check sample shown in FIG. 9, both sides of the check have been scanned. In other embodiments, it may only be desired to scan one side. In the embodiment illustrated, the first image section 905 is the front side of the scanned check. Similarly, a second image section 910 comprises data representing the reverse side of the document, in this case, the back side of the check. Area 915a is the MICR data scanned and is extracted from the full image scan and inserted into a MICR field 915b. The MICR information on the check includes the bank routing number (or ABA number), the payor's checking account number, check number, and may include the dollar amount of the check.

Areas 915c and 915d represent, respectively, routing and control information. The routing and control information is needed so that the image file can be transmitted among financial institutions. The routing information is a number that corresponds to the bank that issued the check. In other words, the bank to which the image file belongs can easily be recognized by an operator. The areas 915c and 915d may be extracted from the area 915a or from the MICR encoding on the check. The numbers illustrated are used as examples and are not meant to represent the exact digits or number of digits used.

Also taken from the MICR encoding line on the check is field 915e, which contains the account number for the check extracted from the image of the check. The account number allows an operator to know which account was debited for the funds.

To further aid the operator in recognizing the account, a field 920b may be included in the image file and contains data indicating the name and address of the owner of the account. This information is taken from an identification section 920a on the image file. Normally, this information is on the upper left side of the check and usually includes at least the name of the owner of the account, and may include address and telephone information.

On the written portion of the check, an amount of transaction is indicated in an amount box 930a. This information may be read from the image and inserted into an amount field 930b. Other written information, such as a payee name 940a, may also be extracted from the full image and added into a field 940b. A check number 950a may be extracted and added into a field 950b to provide a clearer indication of the check number. It should be recognized that the fields illustrated are not inclusive of all possible fields and types of information which can be stored in the image file 900. Indeed, other types of information can be stored as can pointers to other files having, for example, further information relating to the customer. In some cases, it may also be useful to read the memo line of the check. In addition, it is contemplated that an operator may fill in some of these fields. For example, in an embodiment of the present invention that only requires the customer to sign the document, the payee field and amount field may be added to the image before it is processed. The format of the file is standardized for ease of processing, i.e., using .tif or .jpg. This allows other software to process the information in image files for use by the merchant or financial institution.

FIG. 10 depicts an image file 1000 of the invoice according to one embodiment of the invention. A full image of either or both sides of the invoice may be obtained. In this embodiment, it is only a first side 1010 of an invoice that is included in the image file 1000. The first side 1010 contains an address 1020a having the name and address of the company. The address 1020a may be extracted and inserted into an address field 1020b. A field 1030a contains an account number of the customer at the payee. The customer's account number on the invoice is different than the account number on the check in FIG. 9. The account number on the check is the customer's account number at the bank or the account number that is going to be debited to pay the customer's account at the payee. For example, if a customer owes utility A money, utility A will send the person an invoice indicating the amount of payment and the customer's account at the utility. The customer then writes a check drawn on an account at a bank to pay their account at the utility. It is important that the account number 1030a is clearly imaged, because field 1030b informs the company where to apply the funds received.

Numerous invoices contain various dollar amounts that may be owed by a customer. For example, on a standard credit card invoice, the invoice will include a total amount owed 1040a, a minimum amount to be paid 1050a, and a transaction amount 1060a. These amounts may differ. In the illustrated embodiment, the total amount owed 1040a is $100.00, the minimum amount to be paid 1050a is $10.00, and the transaction amount 1060a is also $10.00. In practice, the transaction amount 1060a may be any number, but usually it lies between the minimum amount to be paid 1050a and the total amount owed 1040a. The total amount owed 1040a, the minimum amount to be paid 1050a, and the transaction amount 1060a may all be extracted and put into separate fields 1040b, 1050b, 1060b, respectively, in the image file 1000. Alternatively, any combination of these fields may be extracted in addition to any other fields that may be useful for the payee, customer, payee bank, and/or payor bank.

In order for the payor bank to transmit the funds to the payee bank, the payor bank must be able to ascertain the payee bank's routing number and the account number at the payee bank to be credited. This information may be included on the invoice image file 1000, as illustrated by a line 1070a. The line 1070a provides the routing number and account number for the payee. The line 1070a may be extracted and inserted into a bank routing field 1070b and into a payee account number field 1070c. These two fields may also be input by the operator or customer if the information was not included on the invoice.

In both the image files 900 and 1000, there is certain information that should be the same. For example, a customer wanting to pay an invoice from Credit Services should have a check that names Credit Services as the payee. Also, the transaction amount field 960b of the check (FIG. 9) should match the amount field 1030b on the image file 1000 of the invoice. As discussed above, in one embodiment, the document scanning system 310 includes control panels 320, 330 (FIG. 3). The control panels 320, 330 may be used to view the image files 900 and 1000 to insure that the certain fields match. This would alleviate accounting problems for both the customer and the payee in reconciling the customer's account with the payee.

In one embodiment, the image files 900, 1000 only include the full images of the check and invoice. In this embodiment, none of the data is extracted and added to the image file. In this embodiment, both the payee bank and payor bank would extract required information as needed to process the images.

In yet another alternative embodiment, only the extracted fields, and not the full image, would be transmitted to the payor bank and the payee bank. In this embodiment, the full images may be discarded or the extracted fields may be imaged directly from the document as mentioned above.

Figure 11:
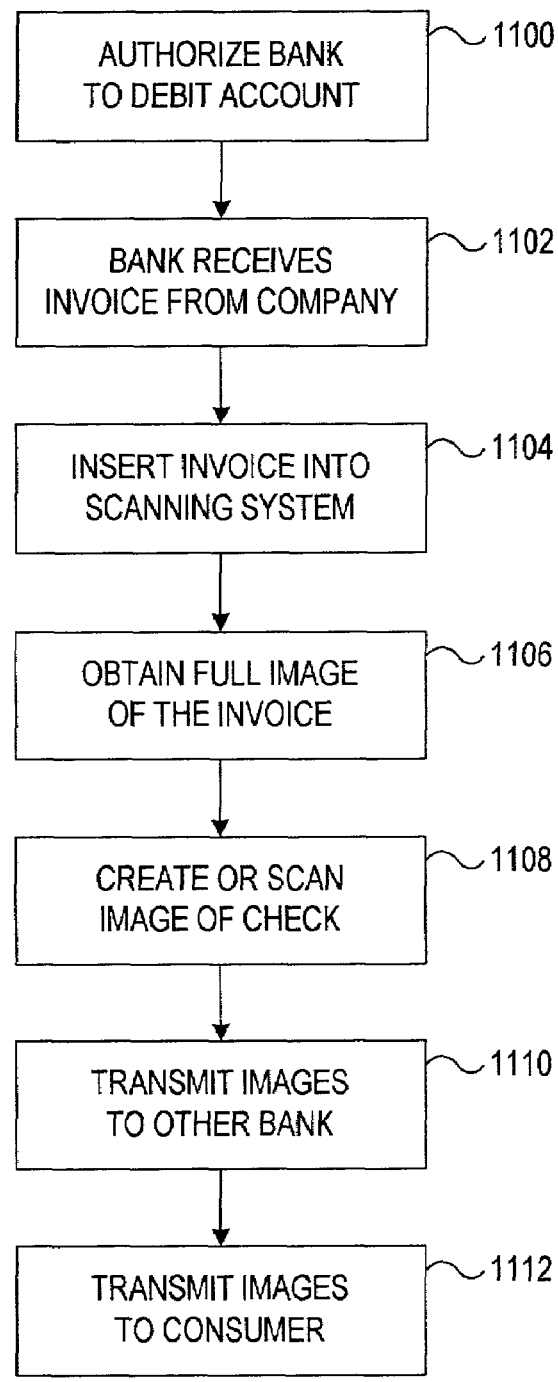
FIG. 11 is a flowchart describing the operation of another embodiment of the present invention.

Turning now to FIG. 11, a flow chart illustrating how one embodiment of the present invention operates is described. In this method, instead of an invoice being mailed to a customer, the invoice is sent directly to a bank. First, as shown in step 1100, the customer authorizes the bank to debit an account belonging to the customer to pay the invoice. This may be done in a manner that is similar to other debit agreements banks have with their customers, such as authorizations to debit the account to pay fees or to allow automated clearinghouse transfers (ACH). The bank also needs to be provided with information regarding how much of the invoice should be paid. For some companies, the entire invoice must be paid (utilities, some credit cards). For others, however, including most credit cards, the customer is given a minimum that must be paid and the balance may remain owed. The customer may provide the bank with instructions to pay the entire invoice when it is presented, only the minimum, or some other predetermined amount. It is also contemplated that the customer could alter this amount on a monthly basis depending on the balance in the account. In another embodiment, the customer may have instructions to pay the invoice after a certain date, or pay as much of the invoice as possible, while leaving a minimum balance in the account.

Once the authorization is established, the process proceeds to step 1102, where the bank receives the invoice directly, instead of the customer. In another embodiment, the customer could receive the invoice and then notify the bank of payment instructions, such as dollar amount, and payee and bank information.

At step 1104, an operator inserts the invoice into a document scanning system. The operator may be an employee or contractor of the bank. The document scanning system then obtains a full image of the invoice in step 1106. The image may be a full image of the document or it may only be of a selected portion of the document. Optical character recognition software (OCR) may be included in the scanning system. The OCR may "read" the image for relevant information, such as the P.O. box number, account number, transaction amount, total amount owed, and minimum amount due.

Next, at step 1108, the operator may create an image of a check for payment. This image may contain all the data commonly found on a check, or it may only contain the data that is needed to conduct the transaction, such as bank routing number, account number, and transaction amount. In another embodiment, the bank operator may fill out an actual check and insert it into the document scanning system for scanning. In another embodiment, the customer may have provided the bank with checks that are already filled out and the operator need only scan the appropriate check. In both of these embodiments, the OCR may again read the whole image or search for the needed images only for processing. In all of these embodiments, it is contemplated that the operator may input any needed information onto the image. For example, if a scanned invoice is lacking a transaction amount, the transaction amount may be keyed in by the operator and, thus, added to the image of the invoice. In one embodiment, the only portion of the check that is filled out is the signature, while the rest of the data is added to the image in such a manner by the operator.

At step 1110, the scanned images are transmitted electronically to the company's bank for payment and processing. There are numerous ways the customer's bank may obtain the company's bank information. The information may be included on the invoice or it may be obtained from the company or the customer. The electronic payment may be processed as a check, whereby the customer's account is not debited until the check is sent back to the customer's bank to be honored. In another embodiment, the payment may be made by a cashier's check. Here, the customer's account is debited immediately, but the funds are still sent to the company's bank via the mail system. In another embodiment, the electronic payment may be paid as an automated clearinghouse payment, such that the funds are first deducted from the customer's account and then electronically transferred along with the images to the bank of the customer.

Once the invoice has been paid, the images are transmitted to the customer in step 1112. This may be done electronically where the images themselves are sent to a customer's website or e-mail address. The images may also be saved on a disk, tape, or other recordable device and then mailed to the customer. In another embodiment, the images of the check and the invoice are printed and mailed to the customer as the invoices are paid. This embodiment would be ideal for people who do not own a computer or do not feel comfortable using a computer for transactions which include account numbers. In another embodiment, the bank may print the images of the scanned items and include the items in the customer's regular bank statement. It is also contemplated that the actual invoice and check (if there is a hard copy) may be stamped with indicia of cancellation or payment and returned to the customer via any of the above-mentioned processes.

Figure 12:
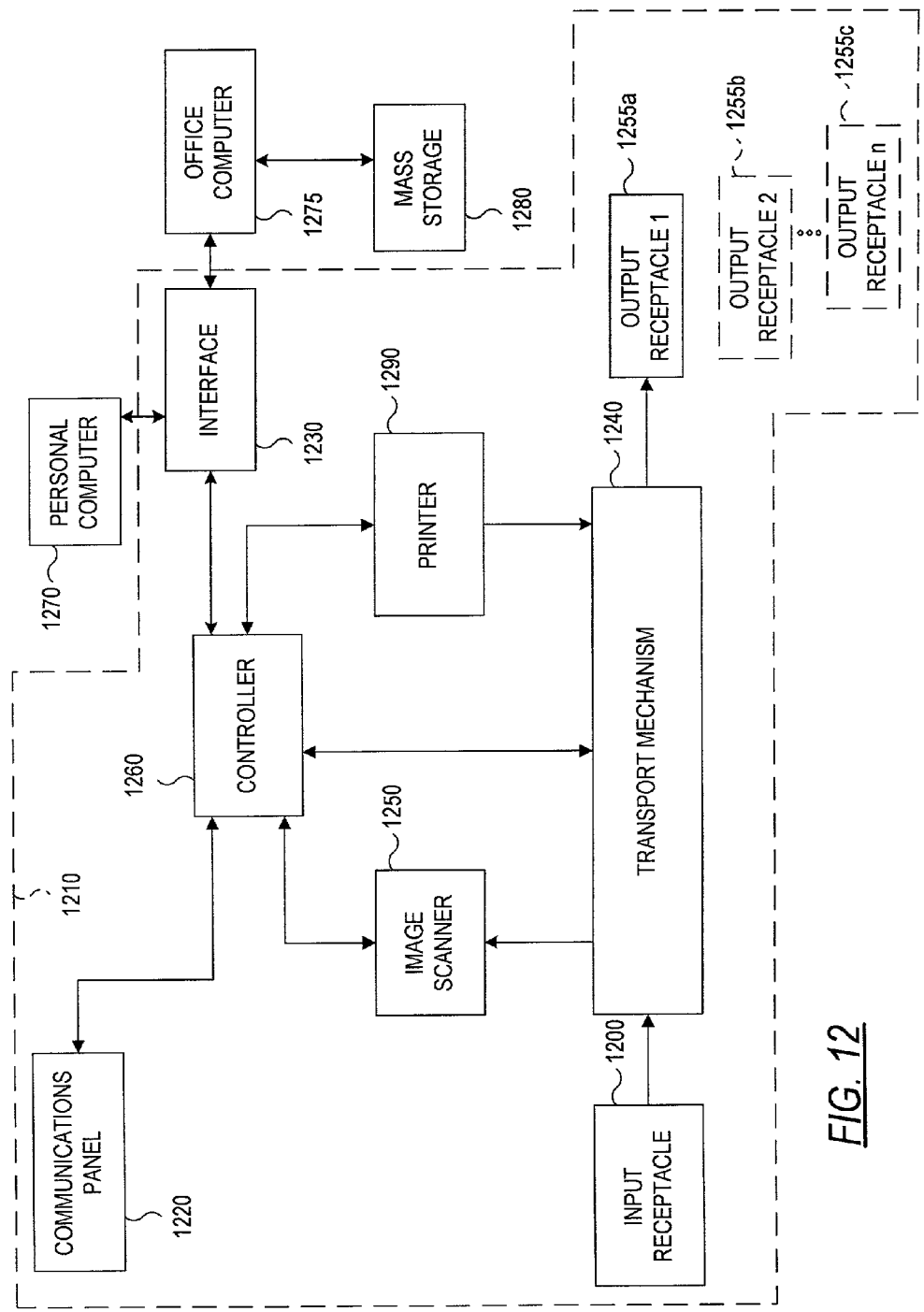
FIG. 12 is a functional block diagram of the components of a document scanning system according to an alternative embodiment of the present invention.

Turning now to FIG. 12, another embodiment of a document scanning system 1210 is described. As illustrated in FIG. 12, the document scanning system 1210 includes an input receptacle 1205 adapted to receive documents from an operator or a customer. The input receptacle 1205 may be one input opening, slot, or bin capable of receiving both invoices and checks to be deposited. Alternatively, the input receptacle 1205 may be two bins, openings, or slots adapted to receive different types of documents. For example, one of the input bins may be adapted to receive only checks, while the other may receive invoices. In other embodiments, the input receptacle 1205 may be of a plurality of input bins, openings, and/or slots, with a separate input for each type of document the scanning system 1210 is capable of accepting.

A transport mechanism 1240 is coupled to the input receptacle and is adapted to carry the documents, one at a time, from the input receptacle 1205 past an image scanner 1250, and to an output receptacle 1255. As illustrated in the drawing, the scanning system 1210 has at least one output receptacle, but may have any number of output receptacles 1255*a-n*. In one embodiment, there are two output receptacles 1255*a-b*. Documents that are scanned properly may be transported into one output receptacle 1255, while documents that are believed to be counterfeit or are not properly scanned may be off sorted to another output receptacle. Also, if there are two types of documents being scanned, checks and invoices, the checks may be transported to one output receptacle 1255, while the invoices are transported to another output receptacle 1255. In an embodiment having three output receptacles 1255*a-c*, each receptacle may receive different types of documents, or one receptacle 1255 may be used to off sort certain documents.

The image scanner 1250 operates similarly to the image scanner 450 in FIG. 4. The image scanner 1250 may obtain full images of the documents or it may only obtain partial images of the documents. The image scanner 1250 also transmits these images to a controller 1260.

The controller 1260 is coupled to the image scanner 1250 and the transport mechanism 1240, and controls the operation of both of these devices. The controller 1260 also communicates information to and from the image scanner 1250. As described above, the image scanner 1250 transmit images to the controller 1260. The controller 1260 may also transmit information to the image scanner 1250 instructing the image scanner 1250 to create image files of the images and what to include in these image files. Alternatively, the controller 1260 may take the images transmitted by the image scanner 1250 and create image files that include the information discussed in FIGS. 9 and 10.

The controller also controls the operation of a printer 1290. The printer 1290 may be used to perform a variety of functions. In one embodiment, the printer 1290 may be used to print the payment agreement on the document. The timing of the printing operation is controlled by the controller 1260. According to one embodiment, the printer 1290 automatically prints the payment agreement on the document. The printer 1290 may also be used to print an indicia of cancellation on a document. For example, if a check is being scanned for electronic transfer purposes, the printer 1290 may print "cancelled," "void," or other such language on the check. The printer 1290 may also operate as does the printer 490 described in FIG. 4.

Also controlled by the controller 1260 is a communications panel 1220. The communications panel 1220 may be used by an operator and/or customer to input information into the image file. Also, the controller 1260 may communicate information to the communications panel 1220. For example, the controller 1260 may instruct the communications panel 1220 to display a message to the operator or customer that the image scanning is complete or that a problem has occurred. The communications panel 1220 may include a numeric keypad, a standard keyboard, denomination keys, a touch screen panel, and/or an electronic pen and screen. All of these devices would allow the operator or customer to input information into the scanning system 1210.

The controller 1260 is also in communication with an interface 1230. The interface 1230 receives information from the controller 1260 and adapts it to be transmitted to an office computer 1275 and/or a personal computer 1270. The personal computer 1270 may be a computer owned by the customer, the computer adapted to receive information such as confirmations that a transaction occurred. For example, if a check written by a customer is scanned and, through the operation of this system, debits an account owned by the customer, the interface may transmit a confirmation to the personal computer 1270. The confirmation may simply be a message indicating that the payment was made or it may include copies of the images of the documents for record keeping purposes. It is also contemplated that the personal computer 1270 may be a computer owned by the payee on the scanned check and may be used to provide the payee with confirmation of the transaction. In another embodiment, two personal computers are linked to the interface, one of the computers is operated by the customer and the other is operated by the payee. In this embodiment, both computers may receive confirmations of the transaction.

The office computer 1275 is the same as the first computer 130 in FIG. 1, and is operated by the payor bank to debit the customer's account for the amount of the check. The office computer 1275 receives the images from the interface, debits the customer's account, and then utilizes the payee information to electronically transfer the finds to the payees account. For reconciliation purposes, a mass storage 1280 is electronically connected to the office computer and may be used to store the images. The mass storage 1280 may be used to store data for record keeping purposes in case a discrepancy were to arise. Also, the mass storage 1280 may be used to temporarily store images until a statement is sent to a customer. The office computer 1275 may retrieve images relating to the customer's account to be included in the monthly bank statement.

The document scanning system 1210, via the link with the office computer 1275, may process transactions substantially immediately. That is, withdrawals may be processed in real time rather than waiting for the end of the day. Alternatively, the document scanning system 1210 may transfer the funds at set periods during the day. For example, the funds and images could be transferred once an hour or once a shift. Alternatively, the office computer 1275 could direct the controller when to transfer the images.

Figure 13:
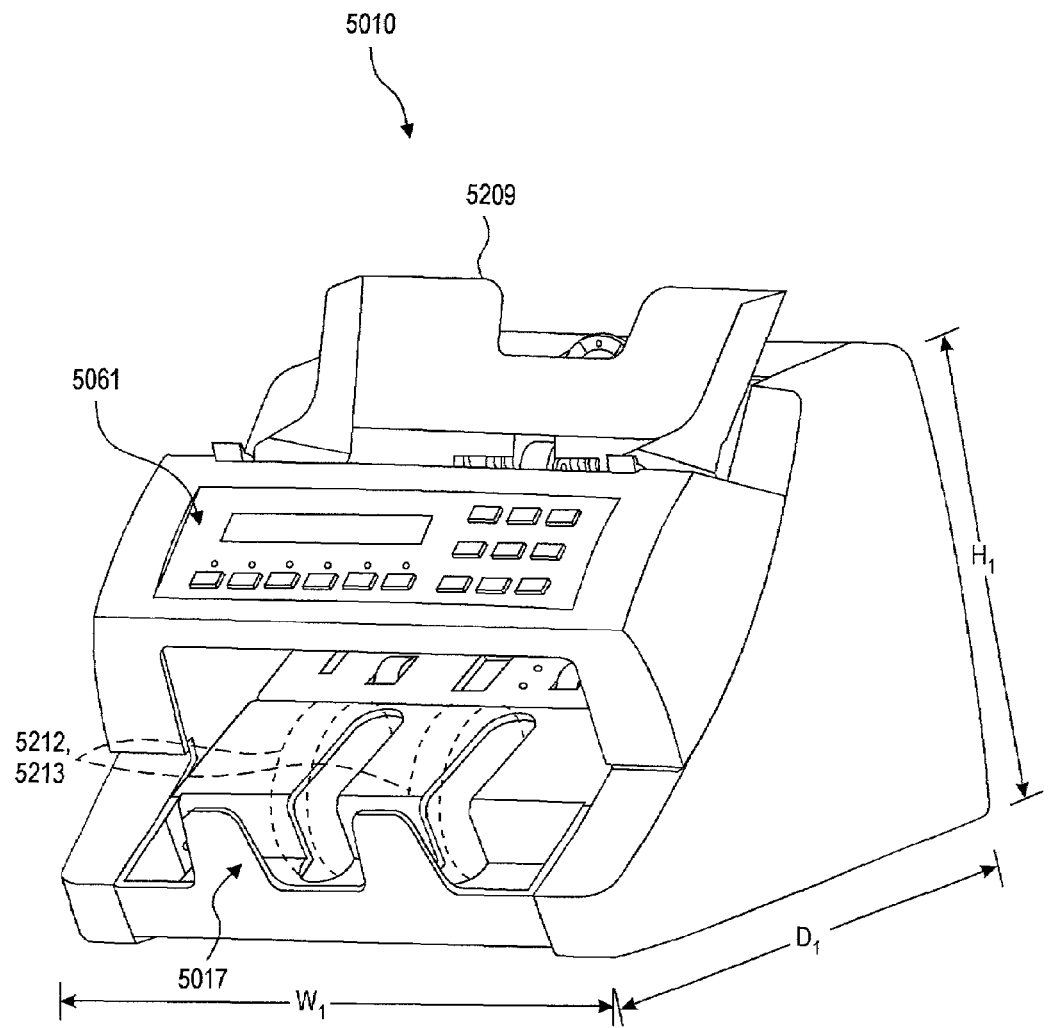
FIG. 13 is a perspective view of a compact document processing system according to one embodiment of the present invention.
Figure 14:
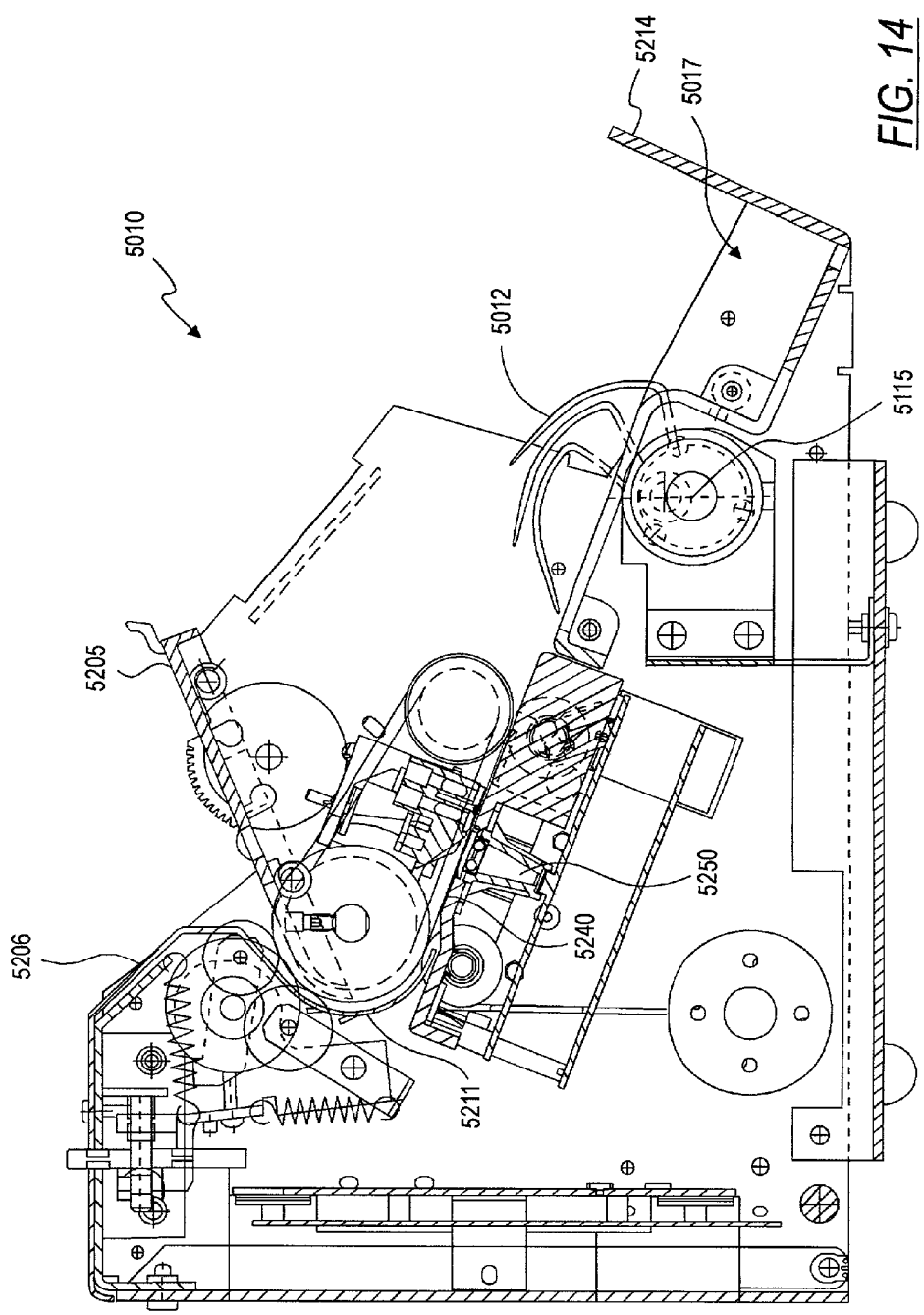
FIG. 14 is a side cross-sectional view of the embodiment shown in FIG. 13.

FIGS. 13 and 14 depict a compact document scanning system according to one embodiment of the present invention. One embodiment of a compact document scanning system is described and illustrated in more detail in U.S. Pat. No. 5,687,963, which is incorporated herein by reference in its entirety. In FIGS. 13 and 14, documents are transported, one by one, from a stack of documents placed in an input receptacle 5209 onto a transport mechanism. The transport mechanism includes a transport plate or guide plate 5240 for guiding a document to an output receptacle 5017. Before reaching the output receptacle 5017, the document can be, for example, evaluated, analyzed, counted, and/or otherwise processed by a full image scanning module. In one embodiment, documents such as checks or invoices are transported, scanned, and identified at a rate in excess of 600 documents per minute. In another embodiment, documents such as checks or invoices are transported, scanned, and identified at a rate in excess of 800 documents per minute. In yet another embodiment, documents such as checks or invoices, are transported, scanned, and identified at a rate in excess of 1000 documents per minute. In another embodiment, documents such as checks or invoices, are transported, scanned, and identified at a rate in excess of 1200 documents per minute.

The input receptacle 5209 for receiving a stack of documents to be processed is formed by downwardly sloping and converging walls 5205 and 5206 (see FIG. 14) formed by a pair of removable covers (not shown) which snap onto a frame. The converging wall 5206 supports a removable hopper (not shown) that includes vertically disposed side walls (not shown). U.S. Pat. No. 5,687,963 also describes one embodiment of an input receptacle in more detail. The document scanning system 5010 in FIG. 13 has a touch panel display 5061 in one embodiment of the present invention which displays "functional" keys when appropriate. The touch panel display 5061 simplifies the operation of the multi-pocket document processing system 5010. Alternatively or additionally, physical keys or buttons may be employed.

From the input receptacle 5209, the documents are moved in seriatim from a bottom of the stack along a curved guideway 5211 (shown in FIG. 14) which receives documents moving downwardly and rearwardly and changes the direction of travel to a forward direction. Although shown as being fed from the bottom, the documents can be fed from the top, front, or back of the stack. The type of feeding used could be friction feed, vacuum feed, or any other method of feeding known to those skilled in the art. An exit end of the curved guideway 5211 directs the documents onto the transport plate 5240 which carries the documents through an evaluation section and to the output receptacle 5017.

Stacking of the documents in one embodiment is accomplished by a pair of driven stacking wheels 5212, 5213 for the output receptacle 5017. The stacking wheels 5212, 5213 are supported for rotational movement about respective shafts 5115 journalled on a rigid frame and driven by a motor (not shown). Flexible blades of the stacking wheels 5212, 5213 deliver the documents onto a forward end of a stacker plate 5214.

According to one embodiment, the document scanning system 5010 is compact, having a height ($H_1$) of about 9 ½ to 10 ½ inches, a width ($W_1$) of about 10 ¾ to 11 ¾ inches, and a depth ($D_1$) of about 12 to 16 inches.

Figure 15:
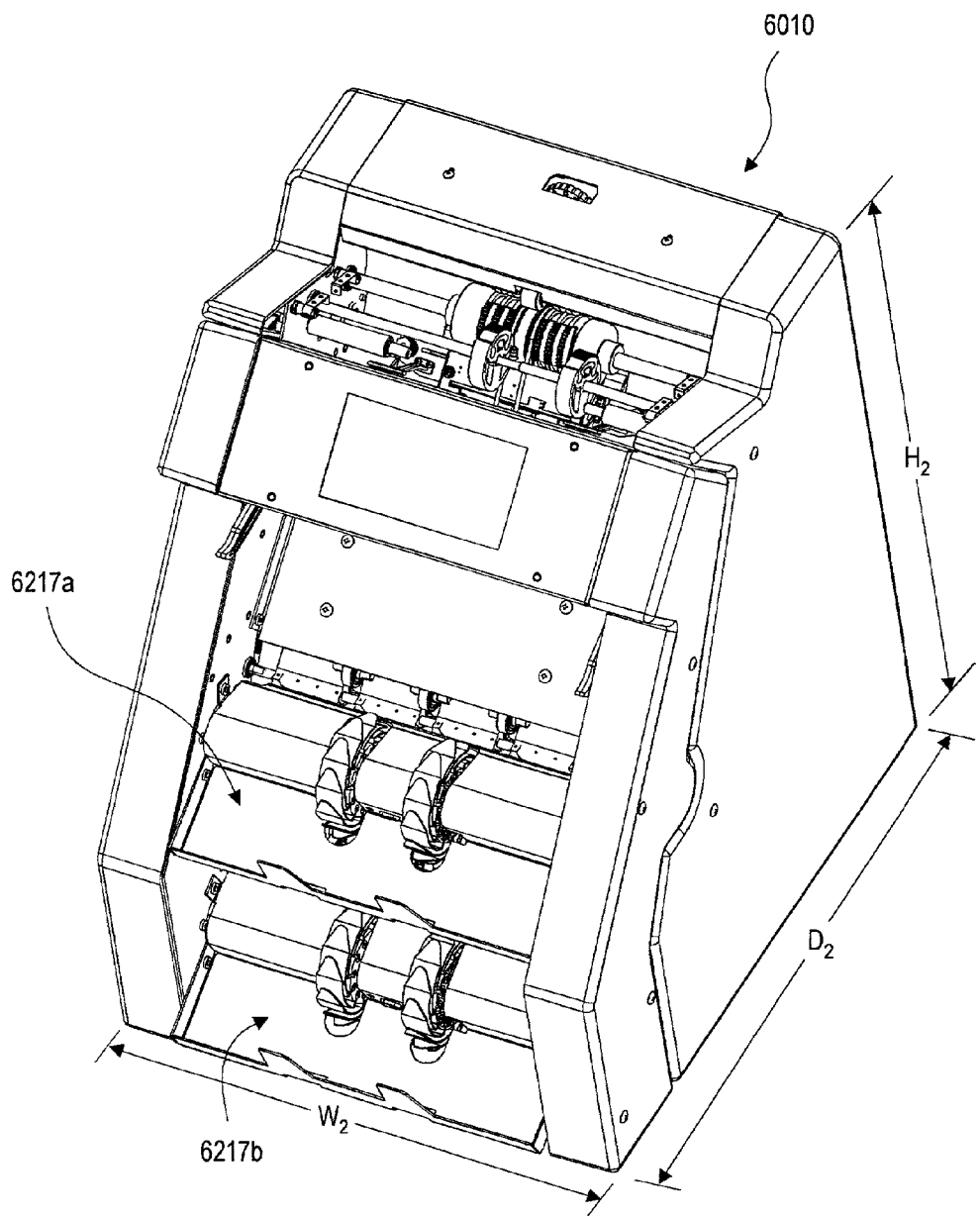
FIG. 15 is a perspective view of a compact document processing system according to another embodiment of the present invention.
Figure 16:
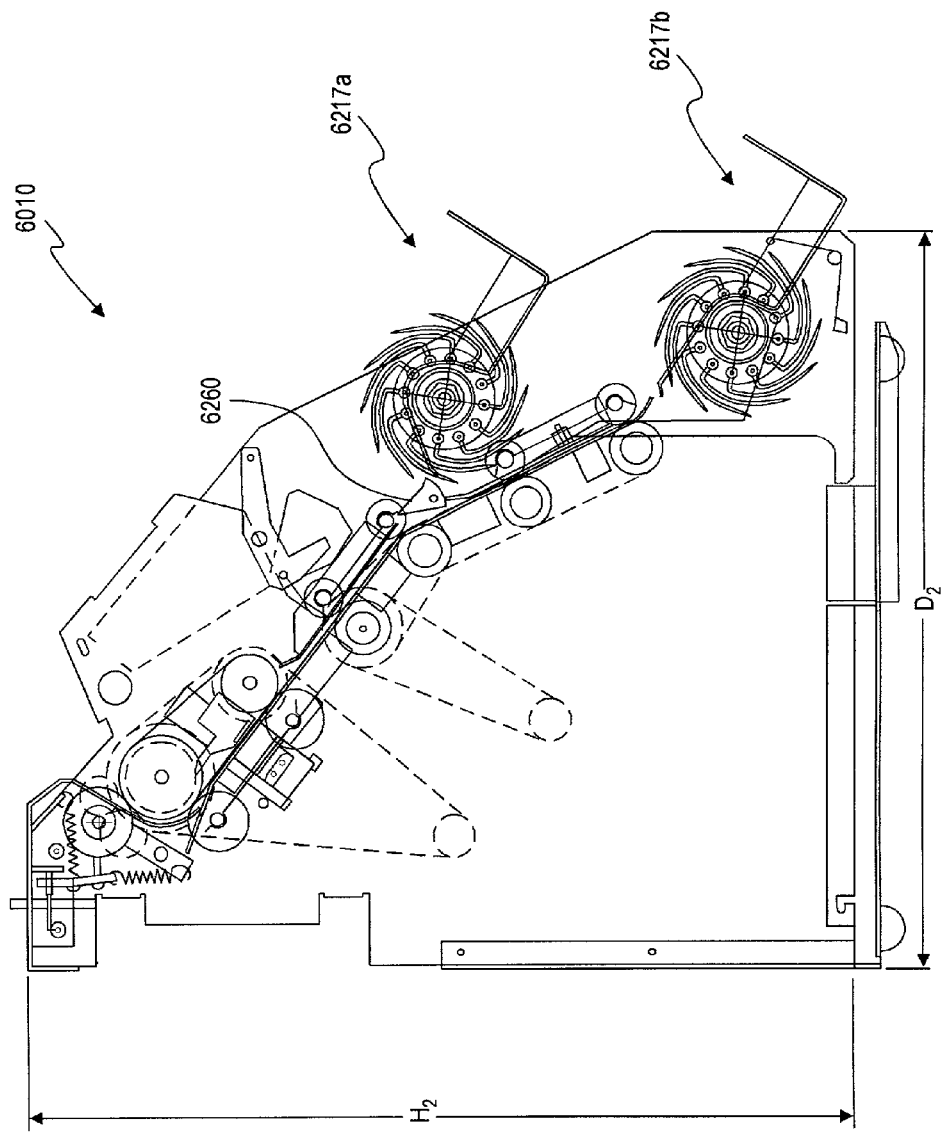
FIG. 16 is a side cross-sectional view of the embodiment shown in FIG. 15.

FIGS. 15 and 16 depict an exterior perspective view and a side cross-sectional view of a compact multi-pocket document scanning system 6010. The process for carrying documents through the system is the same as discussed above, except that the processing system has two output receptacles 6217a, 6217b. In this embodiment, a diverter 6260 directs the documents to either the first or second output receptacle 6217a, 6217b. When the diverter 6260 is in a lower position, documents are directed to the first output receptacle 6217a. When the diverter 6260 is in an upper position, documents proceed in the direction of the second output receptacle 6217b.

According to one embodiment, the document scanning system 6010 is compact, having a height ($H_2$) of about 17 ½ inches, a width ($W_2$) of about 13 ½ inches, and a depth ($D_2$) of about 15 inches. According to another embodiment, the document scanning system has dimensions of a height ($H_2$) of about 18 inches, a width ($W_2$) of about 13 ¾ inches, and a depth ($D_2$) of about 16 inches. The document scanning device 6010 may be rested on a tabletop.

Figure 17:
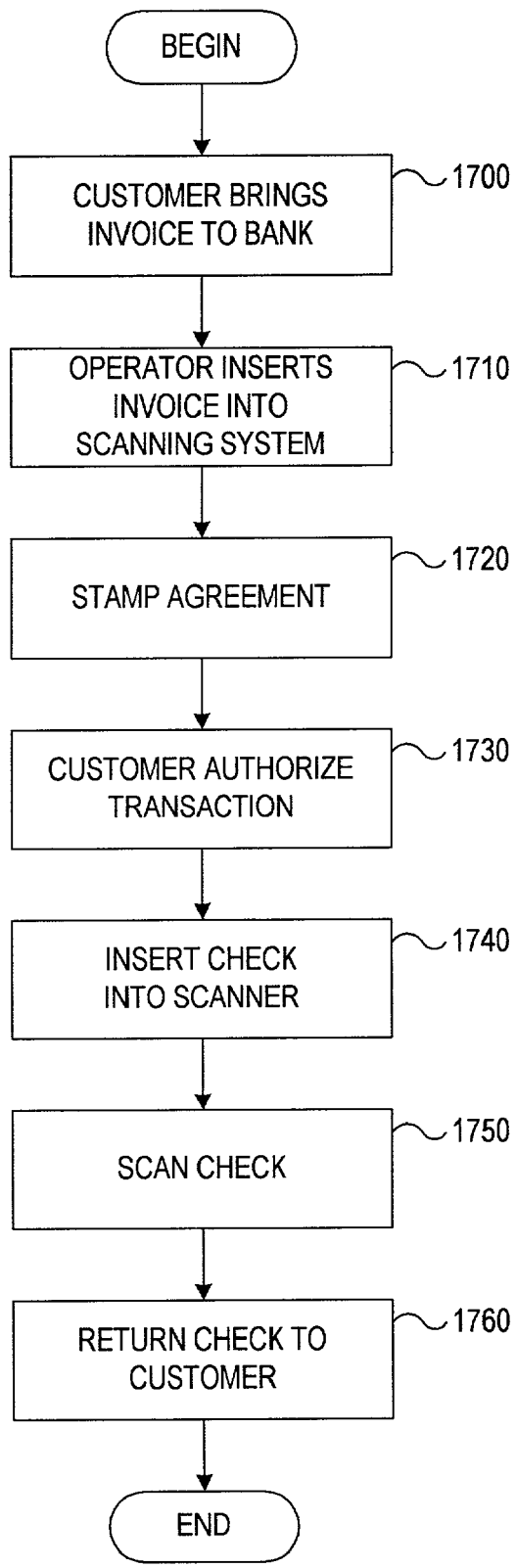
FIG. 17 is a flowchart describing the operation of another embodiment of an automated payment system.

FIG. 17 depicts a flow chart for another embodiment of the present invention. In this embodiment, the customer receives the invoice directly and may bring it to the bank or a location having the scanner to pay the bill. In step 1700, the customer brings the payment coupon or invoice to the bank. For demonstration purposes only, a bank will be used as the place of payment. It is also understood, however, that the place of payment may be anywhere with a scanning system of the present invention. For example, it is contemplated that currency exchanges may have document scanning systems and charge a fee for the service. Also, it is contemplated that other sites that currently offer customers invoice payment services (such as department stores that have drop boxes for payment of in-house credit cards or other locations that accept payment of utility bills) may offer the document scanning system of the present invention as a new method of payment. It is also contemplated that the document scanning systems may be stand alone machines which operate in the same manner as an Automated Teller Machine (ATM).

Returning now to FIG. 17, at step 1710, an operator inserts an invoice and a check or other payment media into the document scanning system. The term "operator" refers to anyone who is operating the machine. It may be a bank or store employee, an independent contractor working for the bank or store, or it may be the customer if a stand alone machine is being used. At step 1720, the document, for example, the check, is stamped with payment or authorization agreement. The payment agreement may be printed on the document by the document scanning system as described above with reference to FIG. 4. Alternatively, it is also contemplated that the payment agreement may be stamped manually onto the document. It is also contemplated that a separate document, such as a receipt, may be stamped with the payment agreement or has the payment agreement printed on it. This process would be similar to issuing a credit card receipt to be signed. The payment agreement allows the bank to debit the customer's account through an electronic transfer, which is different than the conventional clearing path used by banks and other financial institutions in clearing a check. The payment agreement may be printed on the document using a number of the methods discussed above with reference to FIG. 4.

In another embodiment, step 1720 is eliminated and the customer only has to sign the document once. The document scanning system would add to the image any other fields which were desired, i.e., payee name and amount. Also, it is contemplated that a printer would then print this additional information on the document as a receipt, but such a step is not required.

Next, at step 1730, the customer authorizes the transaction. This may be done via signing the document after the agreement has been printed on it, giving a verbal authorization, selecting a button on a communication screen, or signing an electronic signature pad. If a signature is used, it may be handwritten, stamped, or made via other conventional means or may be, for example, an electronic signature. If verbal authorization is given, step 1720 may be eliminated, and the authorization need not be printed on the document. If verbal authorization is given, a printer may print "authorized verbally" or like terms on the document. Also, the image may be tagged with such indicia of authorization.

At step 1740, the check is placed into the document scanning system by the operator. Next, at step 1750, the document scanning system, using full image scanning techniques, scans the check and obtains information from the check for use in the clearing and processing system. The document scanning system may scan for any indicia of cancellation. If some indicia of cancellation is found on the document (indicating that the document has already been processed), the process is terminated and the appropriate authorities may be informed. Also, if the document contains some indicia of cancellation, it is also contemplated that the document would not be returned to the customer, but instead be held by the operator or issuing bank. If no indicia of cancellation is found, the check images may be sent to a central clearinghouse (or first computer 130 as shown in FIG. 1) where the images are processed and payment authorization is made. Some indicia of cancellation may be added to the check, either by the document scanning system or by hand. Finally, at step 1760, the check is returned to the customer, as described below.

Figure 18:
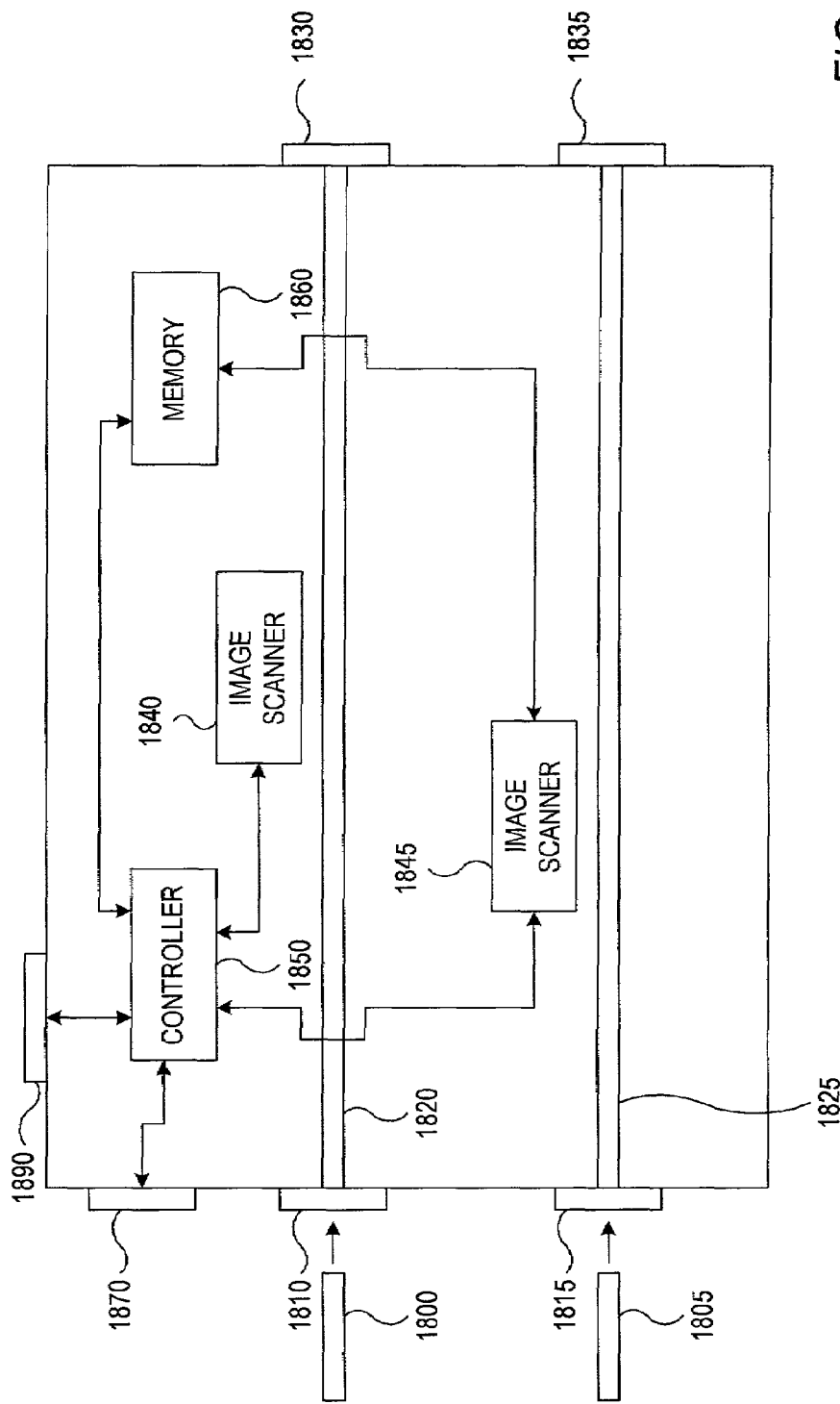
FIG. 18 is a functional block diagram of the components of a document scanning system according to one embodiment of the present invention.

Turning now to FIG. 18, an alternative embodiment of a document scanning system will be described. In the current embodiment, a check 1800 is placed into a scanning system through an input receptacle 1810, which may be a document receiving opening or receptacle, of the scanning system. A transport mechanism 1820 moves the check 1800 past an image scanner 1840 and to an output receptacle 1830.

The image scanner 1840 and the transport mechanism 1820 are electronically coupled to a controller 1850. The controller 1850 controls the image scanner 1840, creates image files, and controls the transport mechanism 1820. The image scanner 1840 operates the same as the image scanner 450, described in FIG. 4. Images of the check 1800 are transmitted from the image scanner 1840 to a memory 1860, which stores the images in case later verification is required. Alternatively, the memory 1860 may not be used and the image of the check 1800 is transported directly to the first computer 130 at the payor bank as described in FIG. 1.

In this embodiment, the scanning system also includes a second input receptacle 1815 adapted to receive invoices. This is useful for situations where a customer is scanning checks and invoices to be paid by the checks. In this system, a second transport mechanism 1825 transports the invoices 1805 past a second image scanner 1845 and to an output receptacle 2035. The second image scanner 1845 is controlled by the controller and directs images to the memory 1860. The memory 1860 operates as described with reference to FIG. 4.

The second input receptacle 1815 may also be used to accept currency bills. This is useful if a customer wants to deposit funds as well as pay a check. Alternatively, one input receptacle may be for checks written by the customer to pay bills, and the other input receptacle may be for currency bills and checks written to the customer for deposit into the customer's account at the payor bank.

The controller 1850 also controls two control panels 1870, 1880. The control panels operate the same as the control panels 420, 430 in FIG. 4.

Figure 19:
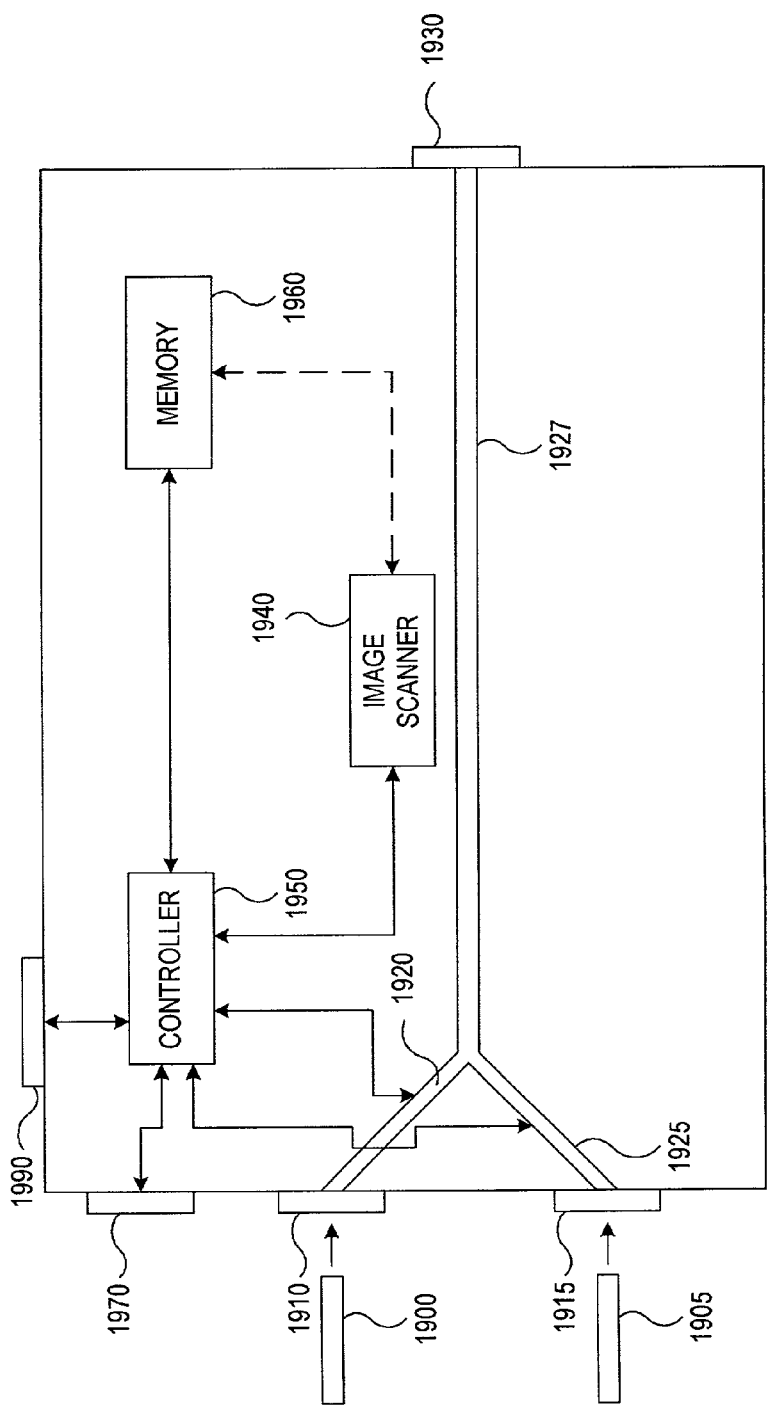
FIG. 19 is a functional block diagram of the components of a document scanning system according to another embodiment of the present invention.

Turning now to FIG. 19, another embodiment of a scanning system having two input receptacles is illustrated. In this embodiment, an invoice 1900 is inserted into a first input receptacle 1910. A first transport mechanism 1920 transports the invoice 1900 from the first input receptacle to a second transport mechanism 1927. The second transport mechanism 1927 transports the invoice 1900 past an image scanner 1940 and to an output receptacle 1930. A second input receptacle 1915 is also included in the scanning system and is adapted to receive a check 1905. A third transport mechanism 1925 transports the check 1905 from the second input receptacle 1915 to the second transport mechanism 1927. The second transport mechanism 1927 transports the check past the image scanner 1940 and to the output receptacle 1930.

The image scanner 1940 is adapted to obtain images of the invoice 1900 and the check 1905 as discussed above in relation to FIG. 4. The images of the invoice 1900 and the check 1905 are transmitted from the image scanner 1940 to a memory 1960, which operates the same as the memory 470 in FIG. 4. Also included in this scanning system are two control panels 1970, 1990, which operate like the control panels 420, 430 in FIG. 4. The two control panels 1970, 1990 are also controlled by the controller 2150.

In another embodiment, the invoices and checks for payment may be inserted via one input receptacle, while currency bills and checks for deposit are inserted via the other input receptacle.

Figure 20:
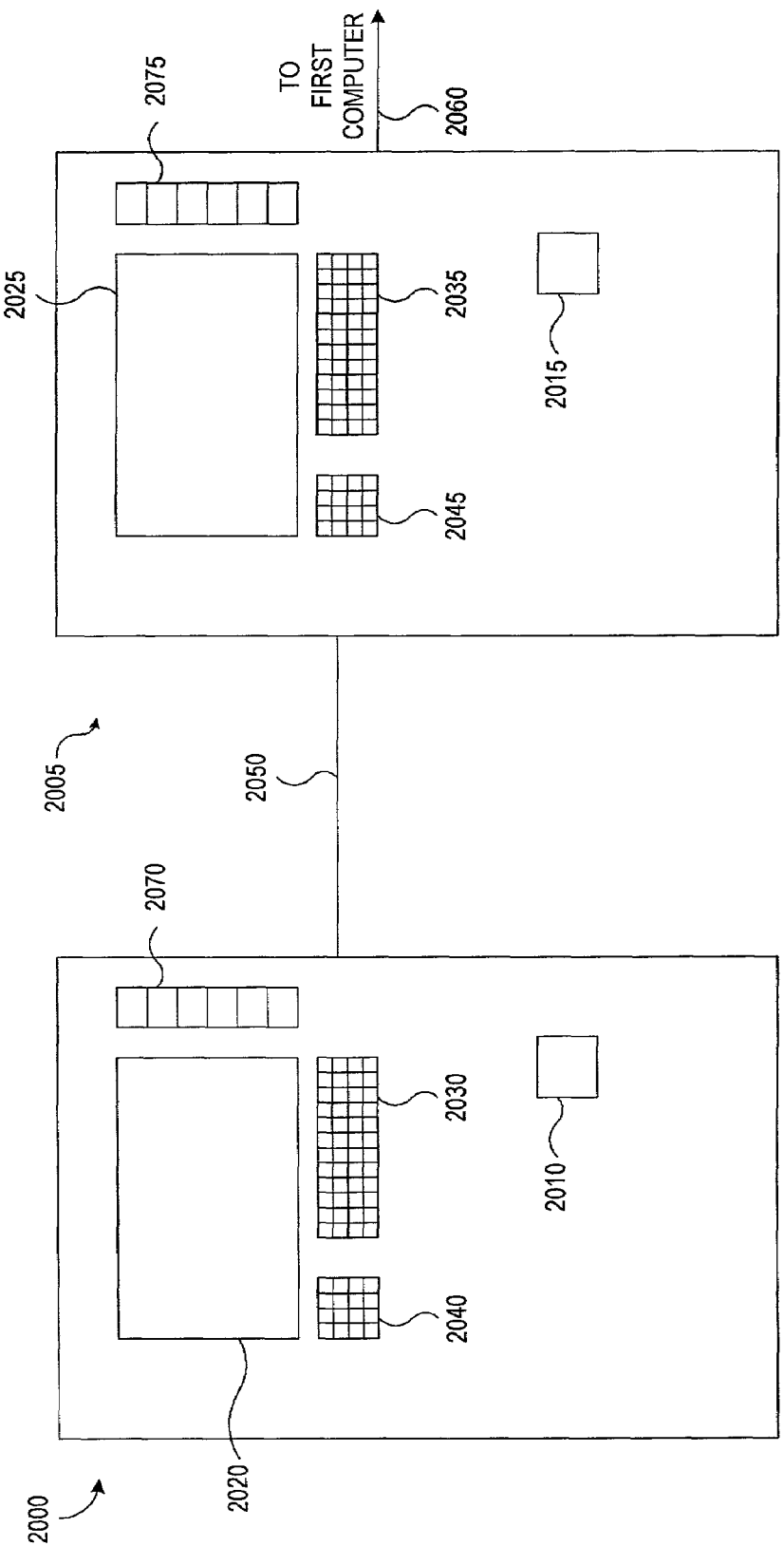
FIG. 20 is a block diagram of a document scanning system according to another embodiment of the present invention.

Turning now to FIG. 20, another embodiment of a scanning system will be described. In this embodiment, two scanning systems 2000, 2005 are linked via a communication link 2050, as defined in FIG. 1. The first scanning system 2000 includes a first input receptacle 2010 for receiving invoices. The first scanning system also includes a display 2020, a keyboard 2030, denomination keys 2070, and a ten-key keypad 2040. The display 2020 may be a video display screen, a touch screen, or other known display. The display 2020 may be used to display a questionable invoice or one that cannot be read by the image scanner. The customer or operator may then utilize the keypad 2040, the denomination keys 2070, and/or the keyboard 2030 to enter information into the image file. Alternatively, if the display 2020 is a touch screen, the customer may enter information on the touch screen.

The second scanning system 2005 includes many of the same features as the first scanning system 2000, such as an input receptacle 2015, a display 2025, a keypad 2045, denomination keys 2075, and a keyboard 2035. The second scanning system 2005, however, is adapted to receive checks into the input receptacle. The checks are then scanned by the scanning system.

In this embodiment, the invoices and checks are scanned by image scanners in the respective systems 2000, 2005 in the same manner as in FIG. 4. The images obtained from both the first and second scanning systems 2000, 2005 are then transmitted via a communication link 2060 to the first computer 130 as depicted in FIG. 1.

In an alternative embodiment, the invoices and checks may be inserted into the first scanning system 2000. The second scanning system 2005 may be used to accept documents for depositing, such as currency bills and checks written to the customer.

All of the embodiments discussed above, which accept both checks written by and to the customer, are beneficial because these embodiments allow one system to be used for a variety of functions. For example, a customer who needs to both pay a bill and deposit a check need only find one machine to do both. It is also contemplated that the document scanning device of FIG. 4 may also accept checks for payment and checks and currency bills for deposit.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. An automated payment system for processing payment of an invoice sent from a payee to a customer, wherein the customer has a bank account at a payor bank and the payee has a bank account at a payee bank, the automated payment system comprising:
    a document scanning system having:
        an input receptacle for receiving the invoice and a check for an amount drawn on the customer's account,
        an image scanner,
        an output receptacle,
        a transport mechanism adapted to transport the invoice and the check from the input receptacle, past the image scanner, and to the output receptacle,
        the image scanner being adapted to obtain at least one video image of the invoice and at least one video image of the check, and
        a controller coupled to the transport mechanism and the image scanner, the controller adapted to control the transport mechanism and the image scanner;
    a first computer at the payor bank communicatively coupled to the document scanning system and adapted to receive the at least one video image of the check and the at least one video image of the invoice, at least one of the document scanning system, the first computer, or a combination thereof configured to extract field information from the video images of the invoice and check, the field information including the amount of the check, the first computer is further adapted to debit the customer's account for the amount of the check; and
    a second computer at the payee bank communicatively coupled to the first computer and adapted to receive the at least one video image of the check and the at least one video image of the invoice from the first computer;
wherein the first computer is further adapted to transmit funds in the amount of the check to the payee bank and the second computer is adapted to receive the funds and to credit the payee's account for the amount of the funds.

2. The processing system of claim 1, wherein the payor bank and the payee bank are different banks.

3. The processing system of claim 1, wherein the payor bank and the payee bank are the same bank.

4. The processing system of claim 1, further comprising a personal computer adapted to receive the at least one image of the check and the at least one image of the invoice from the first computer.

5. The processing system of claim 4, wherein the personal computer is a computer operated by the payee.

6. The processing system of claim 4, wherein the personal computer is a computer operated by the customer.

7. The processing system of claim 1, wherein one of the first computer or the document scanning system is further adapted to obtain an authorization agreement from the customer.

8. The automated payment system according to claim 7, wherein the authorization agreement is obtained verbally from the customer.

9. The automated payment system according to claim 8, comprising a printer for imprinting indicia of verbal authorization on the document.

10. The automated payment system according to claim 7, further comprising an imprinter adapted to imprint the authorization agreement on the document.

11. The automated payment system according to claim 10, wherein the imprinter comprises a stamp adapted to manually stamp the authorization agreement on the document.

12. The automated payment system according to claim 11, wherein the stamp further includes a promise to pay as well as an authorization agreement.

13. The automated payment system according to claim 10, wherein the imprinter includes a printer adapted to print an authorization agreement on the document submitted by a customer.

14. The automated payment system according to claim 13, wherein the printer is further adapted to imprint a promise to pay as well as the authorization agreement on the document.

15. The automated payment system according to claim 7, further comprising an imprinter adapted to imprint the authorization agreement on a receipt.

16. The automated payment system according to claim 15, wherein the imprinter comprises a stamp adapted to manually stamp the authorization agreement on the receipt.

17. The automated payment system according to claim 16, wherein the stamp further includes a promise to pay as well as an authorization agreement.

18. The automated payment system according to claim 17, wherein the imprinter includes a printer adapted to print an authorization agreement on the receipt.

19. The automated payment system according to claim 7, wherein the authorization agreement is displayed to the customer on a video screen.

20. The automated payment system according to claim 19, further comprising an electronic signature pad and an electronic pen, the electronic signature pad adapted to receive a signature from the customer.

21. The automated payment system according to claim 19, further comprising a button on the video screen wherein the customer activates the button to execute the authorization agreement.

22. The automated processing system of claim 7, wherein the authorization agreement is a form signed prior to the transaction occurring.

23. The automated processing system of claim 22, wherein the form authorizes one transaction.

24. The automated processing system of claim 22, wherein the form authorizes a plurality of transactions.

25. The automated payment system of claim 1, further comprising a printer coupled to the controller.

26. The automated payment system of claim 25, wherein the printer is further adapted to inscribe the check with an indicia of cancellation.

27. The automated payment system of claim 25, further comprising a second printer adapted to inscribe the check with a transaction amount.

28. The automated payment system of claim 1, wherein the document scanning system further includes a value entry means adapted to enter a transaction amount into the document scanning system.

29. The automated payment system of claim 28, wherein the document scanning system is further adapted to compare a transaction amount printed on the check against the transaction amount keyed in by the operator.

30. The automated payment system of claim 28, wherein the value entry means is a keyboard.

31. The automated payment system of claim 28, wherein the value entry means is a plurality of denomination keys.

32. The automated payment system of claim 28, wherein the value entry means is a numeric keypad.

33. The automated payment system of claim 28, wherein the value entry means is a touchscreen.

34. The automated payment system of claim 1, the document scanning system further comprising at least one control panel adapted to display information to one of an operator and the customer.

35. The automated payment system of claim 34, wherein the control panel is further adapted to receive a command from at least one of the operator and the customer.

36. The automated payment system of claim 1, wherein the image scanner further comprises multiple scanheads.

37. The automated payment system of claim 1, wherein the image scanner further comprises:
   a mirror adapted to receive an image of a first side of the check and invoice; and
   a single scan head adapted to receive the image of the first side of the check and invoice from the mirror;
   wherein the single scan head receives an image of the second side of the document.

38. The automated payment system of claim 1, wherein the document scanning system transports and scans the check and the invoice such that a longer edge of the document is perpendicular to the direction of transport.

39. The automated payment system of claim 1, wherein the document scanning system transports and scans the check and the invoice such that a longer edge of the document is parallel to the direction of transport.

40. The automated payment system of claim 1, wherein the output receptacle includes a single output bin.

41. The automated payment system of claim 1, wherein the output receptacle includes a first output bin and a second output bin.

42. The automated payment system of claim 41, wherein one of the first and second output bins is adapted to be an off sort bin to receive at least one of checks and invoices unable to be scanned by the document scanning system.

43. The automated payment system of claim 41, wherein the first output bin is adapted to accept checks and the second output bin is adapted to accept invoices.

44. The automated payment system of claim 1, wherein the output receptacle includes a plurality of output bins.

45. The automated payment system of claim 44, wherein one of the plurality of output bins is an off sort bin.

46. The automated payment system of claim 1, further comprising a stacking wheel comprising flexible blades positioned to restack documents in the output receptacle.

47. The automated payment system of claim 1, wherein the scanned image is a full image of the check or invoice.

48. The system of claim 1, wherein said input receptacle is adapted to received at least one of a stack of invoices and a stack of checks.

49. The system of claims 1, wherein said output receptacle is adapted to store at least one of a stack of invoices and a stack of checks.

50. A method of debiting a first financial account and crediting a second financial account, the first financial account belonging to a customer and the second financial account belonging to a payee, the method comprising:
   receiving a check drawn on the first financial account in an input receptacle of a document scanning system;
   receiving an invoice referencing the second financial account in the input receptacle of the document scanning system;
   transporting the check past an image scanner of the document scanning system;
   transporting the invoice past the image scanner of the document scanning system;
   scanning the check and the invoice with the image scanner to generate an electronic image of the check and an electronic image of the invoice;
   obtaining a transaction amount from the image of the check;
   obtaining account information from the image of the invoice;
   transmitting the image of the check and the image of the invoice to a payor financial institution, the financial institution holding the first financial account;
   debiting the first financial account for the transaction amount;
   transmitting the image of the check, the image of the invoice, and funds equal to the transaction amount to a payee financial institution, the financial institution holding the second financial account; and
   crediting the second financial account for the transaction amount.

51. The method of claim 50, further comprising obtaining an authorization agreement from the customer to debit the first financial account.

52. The method of claim 51, wherein the step of obtaining an authorization agreement occurs prior to inserting the check in the input receptacle.

53. The method of claim 51, further comprising examining the check for indicia of cancellation.

54. The method of claim 52, wherein checking for indicia of cancellation is done prior to obtaining the executed authorization agreement.

55. The method of claim 51, further comprising imprinting the authorization agreement on the document.

56. The method of claim 55, wherein imprinting comprises manually stamping the authorization agreement on the document.

57. The method of claim 56, wherein stamping further includes stamping a promise to pay as well as an authorization agreement on the document.

58. The method of claim 55, further comprising providing a printer adapted to print an authorization agreement on the document.

59. The method of claim 51, further comprising imprinting the authorization agreement on a receipt.

60. The method of claim 59, wherein imprinting comprises manually stamping the authorization agreement on the receipt.

61. The method of claim 60, wherein stamping further includes stamping a promise to pay as well as an authorization agreement on the receipt.

62. The method of claim 59, wherein imprinting comprises utilizing a printer to print an authorization agreement on the receipt.

63. The method of claim 51, further comprising displaying the authorization agreement to a customer on a video screen.

64. The method of claim 63, further comprising providing an electronic signature pad and an electronic pen for receiving a signature from the customer to execute the authorization agreement.

65. The method of claim 64, further comprising providing a button for the customer to activate the displayed authorization agreement.

66. The method of claim 65, wherein obtaining the executed authorization agreement comprises obtaining an executed authorization agreement for a single transaction.

67. The method of claim 51, wherein obtaining the executed authorization agreement comprises obtaining an executed authorization agreement for a plurality of transactions.

68. The method of claim 51, further comprising inscribing the check with an indicia of cancellation.

69. The method of claim 68, further comprising returning the cancelled check to the customer.

70. The method of claim 68, further comprising transmitting an image of the cancelled check to the customer.

71. The method of claim 50, comprising obtaining the authorization agreement verbally from a customer.

72. The method of claim 71, comprising imprinting indicia of the verbal authorization on the document.

73. The method of claim 50, further comprising scanning the document such that a longer edge of each of the check and the invoice are perpendicular to the direction of transport.

74. The method of claim 50, further comprising scanning the document such that a longer edge of each of the check and the invoice are parallel to the direction of transport.

75. The method of claim 50, further comprising imprinting a transaction amount on the check.

76. An automated payment system for processing payment of an invoice sent from a payee to a customer, wherein the customer has a bank account at a payor bank and the payee has a bank account at a payee bank, the automated payment system comprising:
  a document scanning system adapted to obtain at least one image of at least one of the invoice and a check;
  a first computer at the payor bank communicatively coupled to the document scanning system and adapted to receive the at least one image of at least one of the check and the invoice, the first computer is further adapted to debit the customer's account for the amount of the check; and
  a second computer at the payee bank communicatively coupled to the first computer and adapted to receive the at least one image of at least one of the check and the invoice from one of the first computer and the document scanning system, the second computer further adapted to credit the payee's account for the amount of the check;
  wherein the amount of the check is extracted from an image of the check.

77. The system of claim 76 further including a printer associated with either the first or second computer, the printer operable to print a substitute check from the at least one image of the check.

78. A method of debiting a first financial account and crediting a second financial account, the first financial account belonging to a customer and the second financial account belonging to a payee, the method comprising:
  receiving via a document scanning system a check drawn on the first financial account and having a transaction amount;
  receiving via the document scanning system an invoice referencing the second financial account;
  obtaining with a first computer an image of the check;
  obtaining the transaction amount from the image of the check;
  obtaining with the first computer or a second computer an image of the invoice;
  transmitting the image of the check and the image of the invoice to a payor financial institution computer, the payor financial institution computer holding information associated with the first financial account;
  debiting the first financial account for the transaction amount;
  transmitting the image of the check to a payee financial institution computer, the payee financial institution computer holding information associated with the second financial account; and
  crediting the second financial account for the transaction amount.

79. The method of claim 78 further including printing at either the payor or payee financial institution of a substitute check from the image of the check.

80. An automated payment system for processing payment of an invoice sent from a payee to a customer, wherein the customer has a bank account at a payor bank and the payee has a bank account at a payee bank, the automated payment system comprising:
  a plurality of document scanning systems, each of the document scanning systems adapted to obtain at least one image of at least one of the invoice and a check;
  a first computer at the payor bank communicatively coupled to each of the plurality of document scanning systems and adapted to receive the at least one image of at least one of the check and the invoice, the first computer is further adapted to debit the customer's account for the amount of the check; and
  a second computer at the payee bank communicatively coupled to the first computer and adapted to receive the at least one image of at least one of the check and the invoice from one of the first computer and the document scanning system, the second computer further adapted to credit the payee's account for the amount of the check;
  wherein the amount of the check is extracted from an image of the check.

81. The system of claim 80 further including a printer associated with either the first or second computer, the printer operable to print a substitute check from the at least one image of the check.

* * * * *

UNITED STATES PATENT AND TRADEMARK OFFICE
CERTIFICATE OF CORRECTION

PATENT NO.       : 7,647,275 B2
APPLICATION NO. : 09/899727
DATED            : January 12, 2010
INVENTOR(S)      : John E. Jones It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2425 days.

Signed and Sealed this

Sixteenth Day of November, 2010

David J. Kappos
*Director of the United States Patent and Trademark Office*